(12) United States Patent
Jacobsz Rosier et al.

(10) Patent No.: US 11,034,404 B2
(45) Date of Patent: Jun. 15, 2021

(54) SCOOTER

(71) Applicant: Etergo B.V., Amsterdam (NL)

(72) Inventors: Bart Jacobsz Rosier, Amsterdam (NL);
Marijn Laurens Flipse, Amsterdam
(NL); Joris Koudijs, Delft (NL);
Adriaan Aarnoudse, Genemuiden
(NL); **Daniël Thomas Alexander
Muusers, Delft (NL); Thomas Swart**,
The Hague (NL); Martijn De Milliano,
Pijnacker (NL)

(73) Assignee: ETERGO B.V., Amsterdam (NL)

( * ) Notice: Subject to any disclaimer, the term of this patent is extended or adjusted under 35 U.S.C. 154(b) by 250 days.

(21) Appl. No.: 16/335,311

(22) PCT Filed: Sep. 21, 2017

(86) PCT No.: PCT/NL2017/050632
§ 371 (c)(1),
(2) Date: Mar. 21, 2019

(87) PCT Pub. No.: WO2018/056819
PCT Pub. Date: Mar. 29, 2018

(65) Prior Publication Data
US 2020/0130771 A1 Apr. 30, 2020

(30) Foreign Application Priority Data

Sep. 22, 2016 (NL) ........................................ 2017515
Sep. 30, 2016 (NL) ........................................ 2017567
Mar. 3, 2017 (NL) ........................................ 2018466

(51) Int. Cl.
*B62J 43/00* (2020.01)
*B62K 19/30* (2006.01)
(Continued)

(52) U.S. Cl.
CPC .............. *B62K 19/30* (2013.01); *B62K 11/02* (2013.01); *B62J 43/00* (2020.02); *B62K 2202/00* (2013.01); *B62K 2204/00* (2013.01)

(58) Field of Classification Search
CPC .. B62K 2204/00; B62K 2202/00; B62J 43/00; B62J 43/30; B62M 6/90;
(Continued)

(56) References Cited

U.S. PATENT DOCUMENTS 5,207,288 A 5/1993 Ono
5,319,557 A 6/1994 Juman
(Continued)

FOREIGN PATENT DOCUMENTS

CN 2550462 Y 5/2003
CN 200967514 Y 10/2007
(Continued)

OTHER PUBLICATIONS

International Search Report and Written Opinion for the International Patent Application No. PCT/NL2017/050632, dated Jun. 27, 2018, 43 pages.
(Continued)

*Primary Examiner* — Ruth Ilan
*Assistant Examiner* — Hosam Shabara
(74) *Attorney, Agent, or Firm* — Kacvinsky Daisak Bluni PLLC

(57) ABSTRACT

A scooter includes a diversity of sensors to adapt scooter characteristics to any one or more than one of safety aspects, and scooter, environmental or driver states. Scooter characteristics susceptible to adaptation include throttle response; motor torque; motor speed; speed; maximum current drawn from energy storage system; braking characteristics, such as distribution, maximum braking power, anti-blocking system parameters or braking; adjusting vehicle dynamics, and
(Continued)

suspension parameters such as stiffness, or damping coefficient.

9 Claims, 15 Drawing Sheets

(51) Int. Cl.
*B62K 11/02* (2006.01)
*B60L 53/80* (2019.01)
*B60K 1/04* (2019.01)

(58) Field of Classification Search
CPC ....... B62M 7/02; B62M 7/06; B60L 2200/12; B60L 2200/24
USPC ........................................................ 180/220
See application file for complete search history.

(56) References Cited

U.S. PATENT DOCUMENTS

| | | |
|---|---|---|
| 6,324,464 B1 | 11/2001 | Lee et al. |
| 2004/0143373 A1 | 7/2004 | Ennis |
| 2008/0041127 A1 | 2/2008 | Xavier et al. |
| 2015/0057885 A1 | 2/2015 | Brady et al. |
| 2015/0099495 A1 | 4/2015 | Crosbie et al. |
| 2015/0112570 A1 | 4/2015 | Schmüdderich |
| 2015/0123611 A1* | 5/2015 | Huang ................ B60L 11/1822 320/109 |

FOREIGN PATENT DOCUMENTS

| | | |
|---|---|---|
| CN | 203612105 U | 5/2014 |
| CN | 204567876 U | 8/2015 |
| DE | 102013224725 A1 | 6/2015 |
| EP | 1081035 A2 | 3/2001 |
| EP | 1508480 A2 | 2/2005 |
| EP | 1783023 A1 | 5/2007 |
| EP | 2423087 A1 | 2/2012 |
| JP | S5953287 A | 3/1984 |
| JP | H04358980 A | 12/1992 |
| JP | H05330465 A | 12/1993 |
| JP | H06127449 A | 5/1994 |
| JP | H0644691 U | 6/1994 |
| JP | H07156852 A | 6/1995 |
| JP | H0966877 A | 3/1997 |
| JP | H09263279 A | 10/1997 |
| JP | H09323680 A | 12/1997 |
| JP | H11115858 A | 4/1999 |
| JP | 2001114153 A | 4/2001 |
| JP | 2001114155 A | 4/2001 |
| JP | 2001114157 A | 4/2001 |
| JP | 2001114173 A | 4/2001 |
| JP | 2001114180 A | 4/2001 |
| JP | 2001119801 A | 4/2001 |
| JP | 2001119802 A | 4/2001 |
| JP | 2010228661 A | 10/2010 |
| JP | 2012221116 A | 11/2012 |
| TW | 201103798 A | 2/2011 |
| WO | 2011101908 A1 | 8/2011 |

OTHER PUBLICATIONS

International Preliminary Report of Patentability for the International Patent Application No. PCT/NL2017/050632, dated Feb. 13, 2019, 17 pages.
Second Written Opinion for the International Patent Application No. PCT/NL2017/050632, dated Nov. 6, 2018, 18 pages.

* cited by examiner

SCOOTER

This is a national stage application filed under 35 U.S.C. § 371 of pending international application PCT/NL2017/050632 filed Sep. 21, 2017, which claims priority to Netherlands Patent applications NL 2017515, filed Sep. 22, 2016, NL 2017567, filed Sep. 30, 2016, and NL 2018466, filed Mar. 3, 2017, the entirety of which applications are hereby incorporated by reference herein.

The present disclosure relates to a scooter. Scooter are known to have a frame, wheels, and a normally combustion based engine. Electric scooters have recently made an appearance in the market.

According to the present disclosure a scooter is provided to comprise
 a scooter body;
 at least two wheels suspended from the scooter body;
 a controller, and
 at least one safety sensor to monitor at least one safety aspect influencing safety of drivers, passenger and/or bystanders, and the like,
wherein the controller is configured to adapt scooter characteristics to the safety aspect determined by the safety sensor.

The controller may be connected to a display and configured to visualize on the display indications of the scooter characteristics adapted by the controller.

The controller may be configured to attribute a safety score on a scale to the safety aspect determined by the sensor, and adapt the scooter characteristic, when a safety score exceeds a predetermined threshold. The controller may then be configured to adapt the predetermined threshold for any safety aspect based on a safety score for another safety aspect, for example adapting a safe threshold for the safety aspect of speed based on a determined traffic intensity, for example detected using a microphone indicating traffic intensity through a traffic noise input or using a camera and image processing.

The scooter may comprise at least one additional sensor, wherein the controller is configured to attribute weights to safety aspects determined by the sensor and the at least one additional sensor, and determine an overall safety level from the weighted safety aspects. Weights may then be attributed to the safety aspects are at least one of a group of: determined based on analysis of for example of driver behavior; predetermined based on experimentation and/or simulation; determined based on driver behavior; and/or adjustable by a driver.

The safety sensor may comprise a seat or cargo weight sensor, and the controller may then be configured to adapt at least one scooter characteristic from a group, at least comprising: suspension stiffness and damping, motor drive power, throttle response.

The safety sensor may comprises at least one sensor from a group comprising at least one of: a wheel speed sensor, a GNSS or GPS (154) positioning sensor and an accelerometer or a gyroscope (155), wherein the controller may then be configured to adapt at least one scooter characteristic from a group, comprising maximum speed, acceleration.

The safety sensor may comprises a camera, wherein the controller may then be configured to determine a safety aspect from a group at least comprising user attention to traffic, traffic intensity and rear or front traffic distance.

The safety sensor may comprise a microphone, wherein the controller may then be configured to determine a safety aspect from a group at least comprising traffic intensity.

The scooter may further comprise a communication, application or entertainment display for visualization of at least one for the scooter non-essential application interface, wherein the controller may then be configured to enable, disable or adapt applications for the display based on a determined safety aspect, wherein adaptation could comprise selectively showing and hiding icons, changing font size and display colours, and the like.

In another aspect a scooter according to the present disclosure comprises:
 a scooter body;
 at least two wheels suspended from the scooter body;
 a controller, and
 at least one scooter sensor,
wherein the controller is configured to estimate a scooter state based on input from at least one scooter sensor and adapt scooter characteristics to the determined scooter state.

The at least one scooter sensor may be selected from a group comprising: charging sensor, accelerometer in all directions (x/y/z), an accelerometer or a gyroscope (155), a wheel Speed sensor, a throttle position sensor, a steering angle sensor (153), a brake pressure sensor, a tire pressure sensor, a suspension travel sensor, a motor axle position, a shunt sensor, an internal temperature sensor, a pressure sensor in seat (24) and/or footrest (22), a kickstand position sensor (152), a main stand position sensor, a passenger footrest sensor, and a GNSS system, such as a GPS (154).

The scooter state may be at least one or more than one combined state selected from a group, comprising: standstill (e.g. on kickstand), straight driving, cornering, charging, tire friction, load of people and/or cargo, exerted forces acting on the scooter, velocity, and power consumption.

In another aspect of the present disclosure a scooter comprises:
 a scooter body;
 at least two wheels suspended from the scooter body;
 a controller, and
 at least one environmental sensor,
wherein the controller is configured to estimate a environmental state based on input from the at least one environmental sensor and adapt scooter characteristics to the determined environmental state.

The at least one environmental sensor may be selected from a group comprising: a front facing camera (130), a passenger facing camera (129), a proximity sensor, such as: sonar, radar, ultrasonic, magnetic and IR; a humidity sensor, an outside temperature sensor; a light intensity sensor; a touchscreen for precipitation detection, a detector for connectivity possibilities such as a GNSS system, for example a GPS (154), 3G, 4G, WiFi, NFC, Bluetooth, and the like for finding information about weather conditions, traffic and road works, date, time, location.

The environmental state may be at least one or more than one combined state selected from a group, comprising: bad road conditions (puddles, potholes, sand, ice etc); obstacles, such as people and animals around the vehicle; lane markings; weather condition, such as sun light level, temperature level, humidity levels, precipitation (snow, hail, rain); traffic condition, road works, speed limits or other traffic rules; nearby gatherings of people such as events, demonstrations, and the like.

In yet another aspect of the present disclosure, a scooter comprises:
 a scooter body;
 at least two wheels suspended from the scooter body;
 a controller; and
 at least one driver sensor, wherein the controller is configured to estimate a driver state based on input from the at least one driver sensor and adapt scooter characteristics to the determined driver state.

The at least one driver sensor may be selected from a group comprising: a driver facing camera (129); a display sensor at or of a display (174); a load sensor (26).

The driver state may be one selected from a group, comprising: driver attention to any of traffic; driver attention for content visualized on a display (174); driver response time to content visualized on the display (174); driver position, such as sitting on the vehicle, standing on the footrest, direction of looking, in particular left, right, ahead, to the screen, to the road, backwards, etc; driver state of mind, such as happy, sad, aggressive, impulsive, etc; driver is sleeping; alertness of driver, and the like.

In all above aspects of the present disclosure, the controller may be configured to adapt at least one scooter characteristic of a group, comprising adapting; throttle response; motor torque; motor speed; speed; maximum current drawn from energy storage system; braking characteristics, such as distribution, maximum braking power, anti blocking system parameters or braking; adjusting vehicle dynamics, such suspension parameters (stiffness, damping coefficient).

Additionally or alternatively, the controller may further be configured to, in case of adapted scooter characteristics, generate an action of from a group, comprising: a driver alert, such as sounds, indicators, vibrations, pop-ups on a display (174); a bystander alert, such as light signals; scooter shut down; call for assistance with or without driver permission.

Regardless of whether a scooter is electric or combustion based, the present disclosure proposes in a further aspect to augment scooters to at least comprise: a steer having handles; an accommodation for a display and a display at the accommodation; and at least one operating button associated with at least the display, wherein the operating button is arranged in thumb reach from the handle to enable blind operation of the operating button by a user driving the scooter.

Thereby more versatile scooter may be provided, with more functionality based on programs and/or apps, as well as the possibility of integrating a controller in the scooter or employing the controller of a user's mobile device as the controller for the scooter.

The present disclosure also relates to multiple preferred embodiments, to which the scope of protection for the present disclosure is not limited.

For example, a scooter may further comprise at least one additional operating button associated with a scooter function, such as switching lights on and off, sounding a horn, and the like.

In yet another additional or alternative embodiment, a scooter may exhibit the feature that the at least one operating button is arranged intermediate the handle and the display.

In yet another additional or alternative embodiment, a scooter may exhibit the feature that the scooter comprises an operating system associated with the display, enabling execution of programs and/or apps and generating a user interface associated with the programs or apps, displayed on the display. In such an embodiment a scooter may exhibit the additional feature that the operating system is configured to enable user influence by operation of the operating button in any one or more than one of: the operation of the operating system; at least one of the programs; at least one of the apps; and functionality of the scooter.

In yet another additional or alternative embodiment, a scooter may exhibit the feature that the operating system is configured to show a user interface on the display.

In yet another additional or alternative embodiment, a scooter may exhibit the feature that the at least one button is incorporated into a control interface. In such an embodiment a scooter may exhibit the additional feature that the control interface has a domed structure enabling a user to navigate to a selected one of the at least one button in a tactile manner without looking.

In yet another additional or alternative embodiment, a scooter may exhibit the feature of speakers under control of the at least one operating button. In such an embodiment a scooter may exhibit the additional feature that the at least one operating button is attributed a function associated with play functions, such a s volume up, volume down, next track, previous track, player on, player off, and the like.

In yet another additional or alternative embodiment, a scooter may exhibit the feature that the display is configured to mirror or emulate a personal portable or mobile device of a user, in that the display shows user output for a user, the same as a mobile device of the user, or at least a part thereof, for example only a song title of a song being played or streamed, instead of all the information on the display of the mobile device.

In yet another additional or alternative embodiment, a scooter may exhibit the feature that the accommodation for and of the display comprises an adapter enabling a user to couple a personal portable or mobile device with the scooter. In such an embodiment a scooter may exhibit the additional feature that the personal portable or mobile device is provided with programs and/or apps to execute functions related to the scooter and/or programs and/or apps, replacing a scooter based controller, and potentially extending the mere scooter based controller for control of only the scooter with functionalities and apps that are inherent to the mobile device.

Preferred embodiments of the present disclosure are defined in the dependent claims.

In the following description preferred embodiments of the present disclosure are further elucidated with reference to the drawing, in which.

Figure 16A:
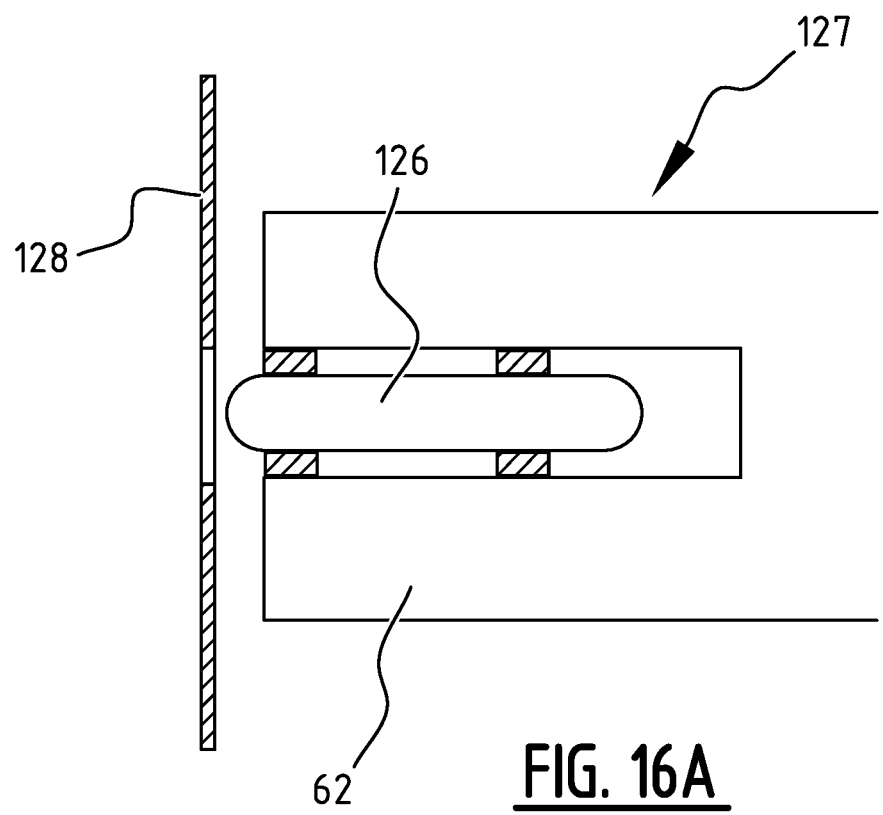
Figure 16B:
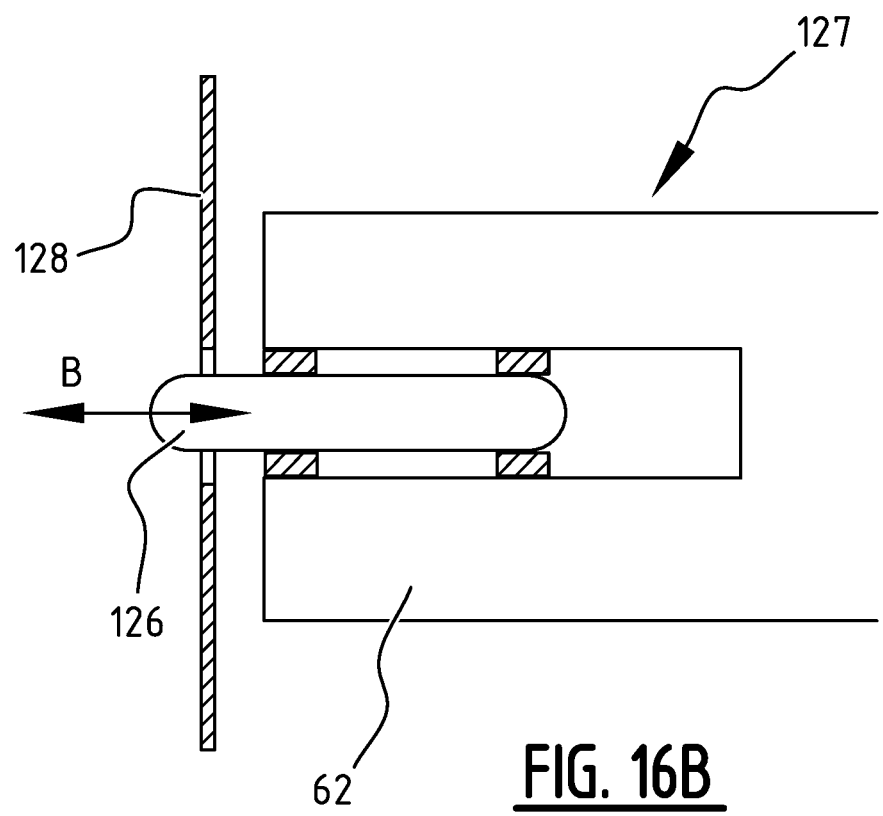
Figure 17:
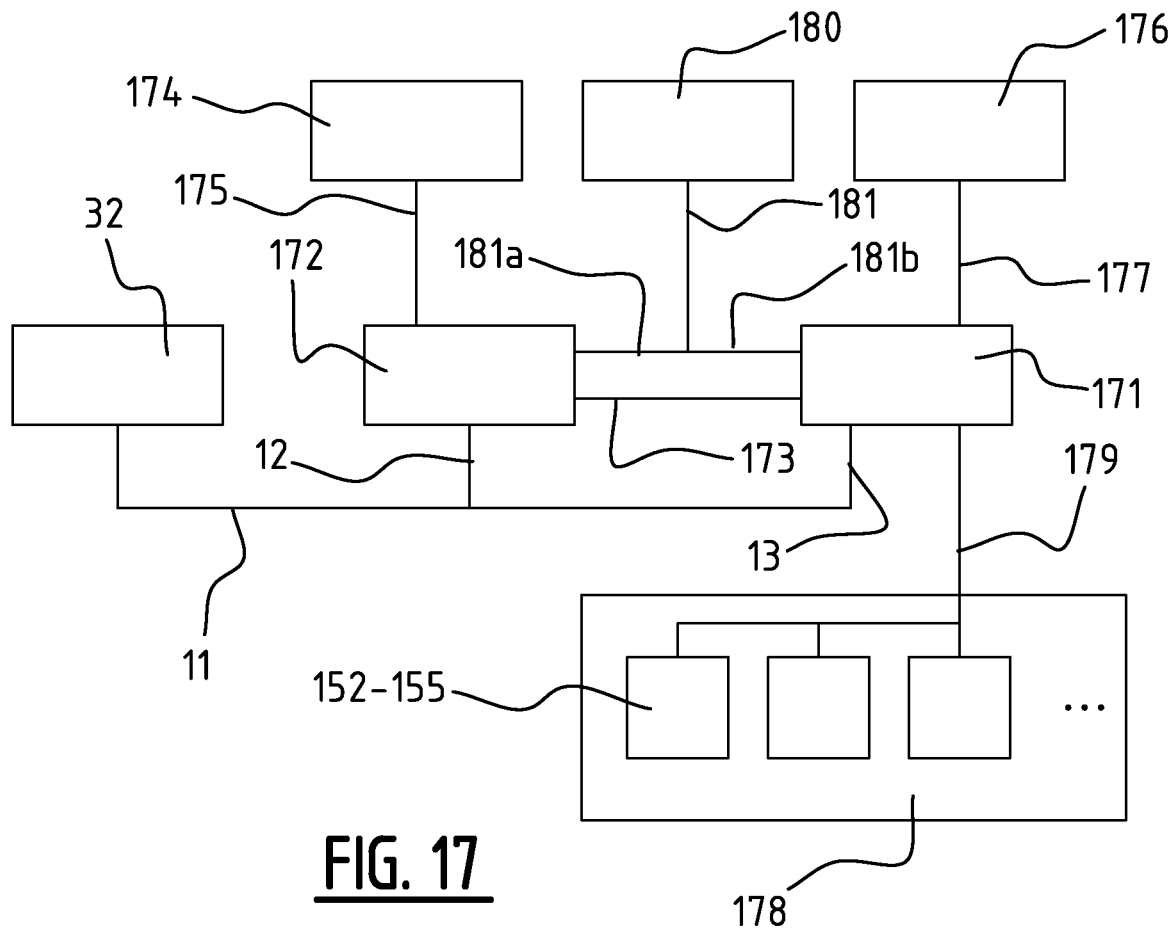
Figure 18:
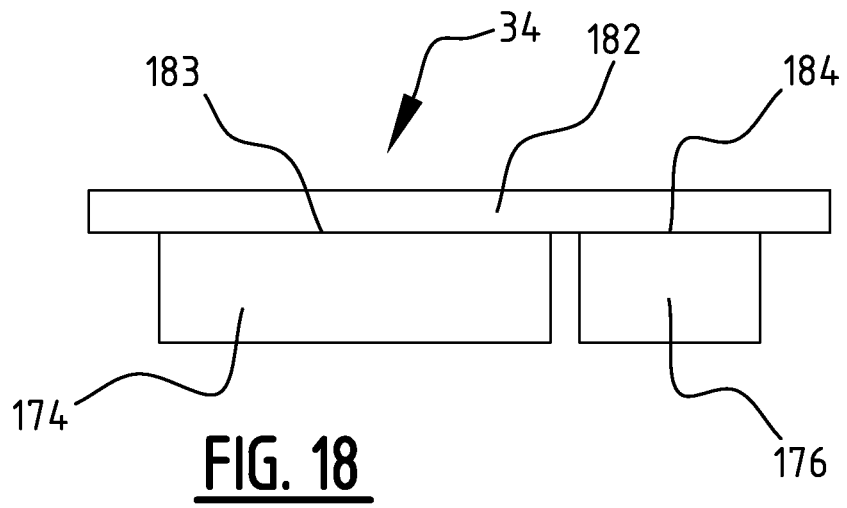
Figure 19:
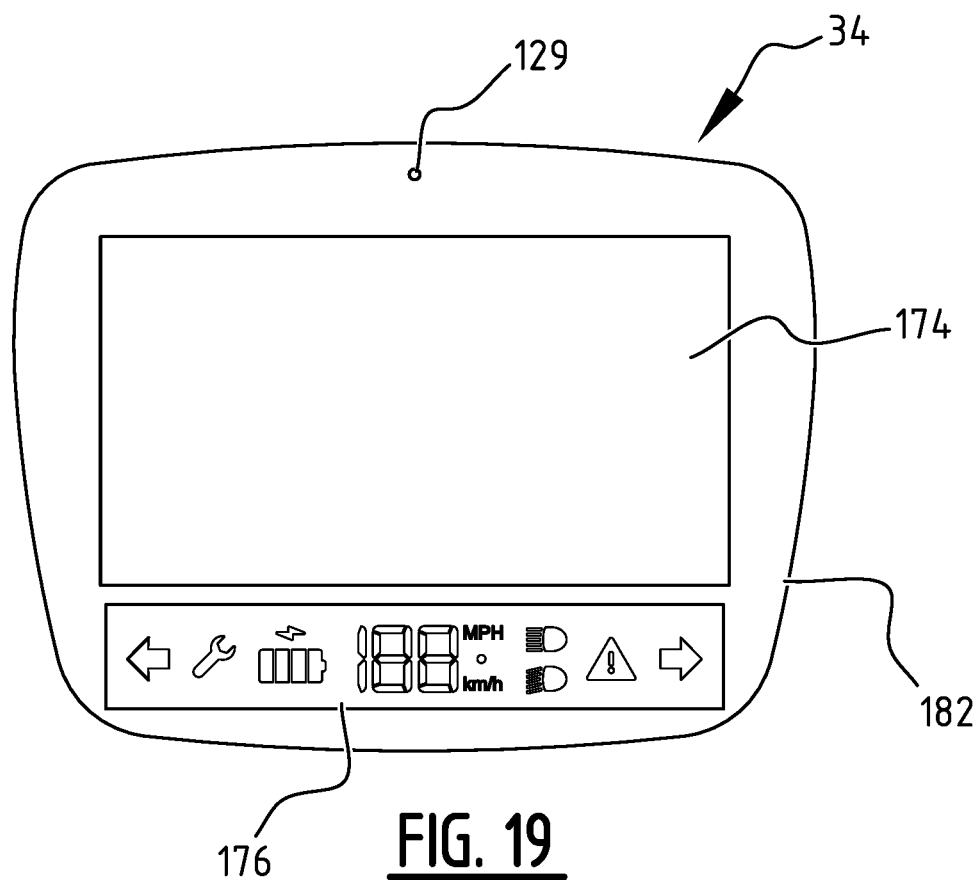
Figure 20:
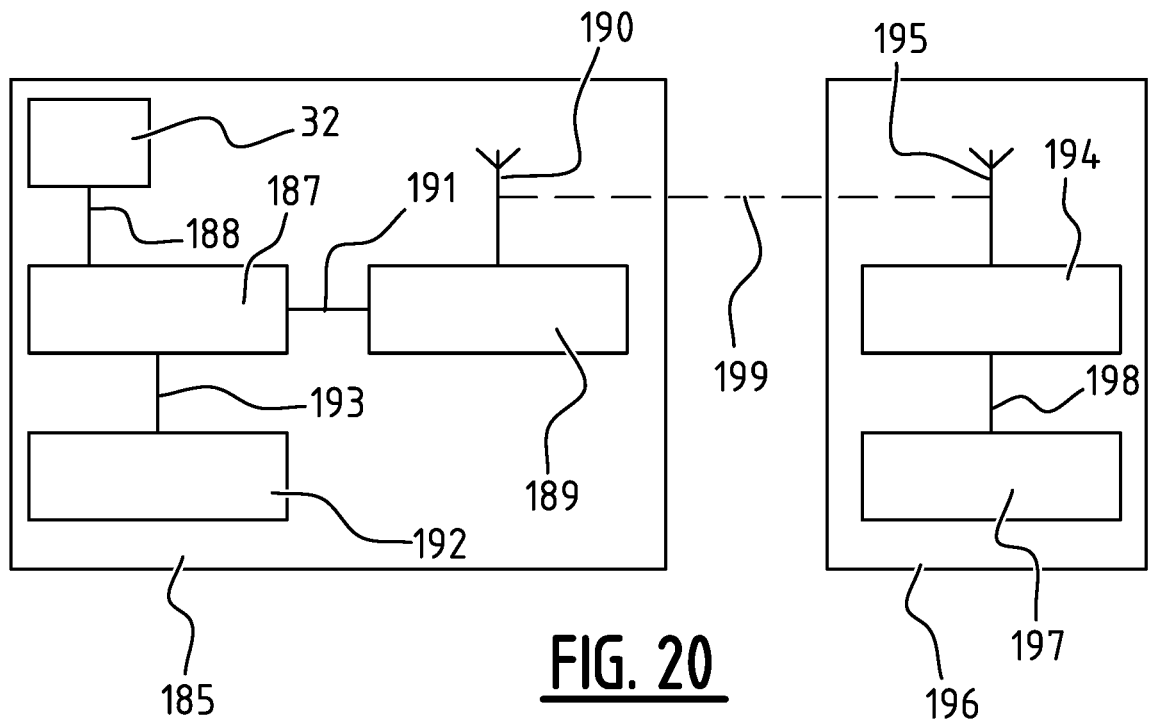
Figure 21:
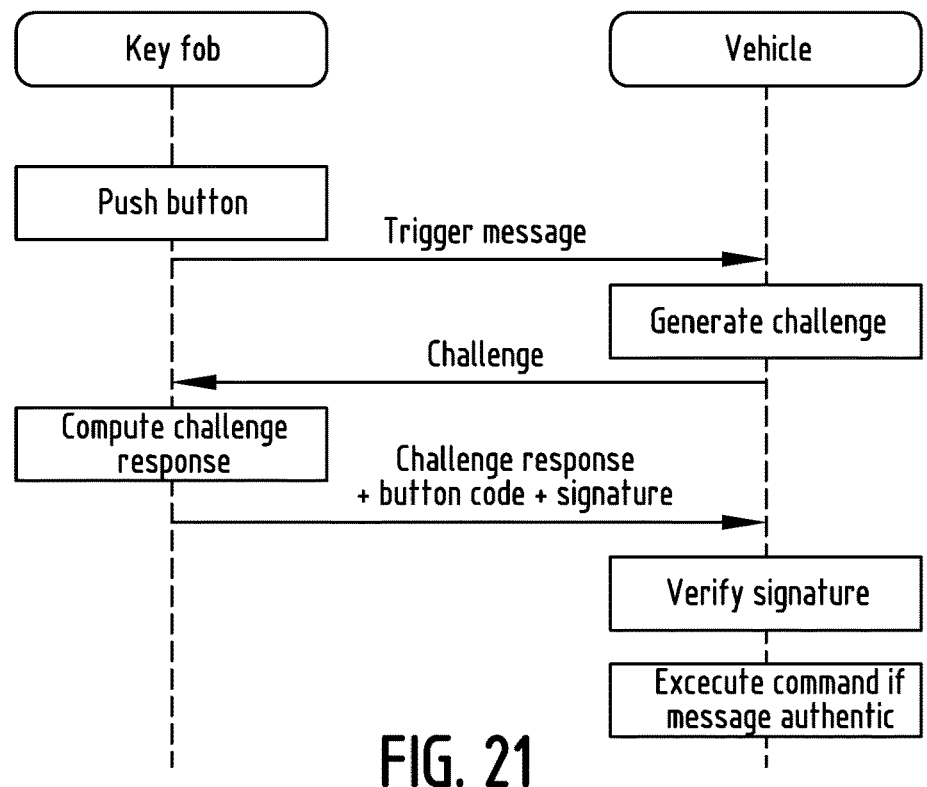
Figure 22:
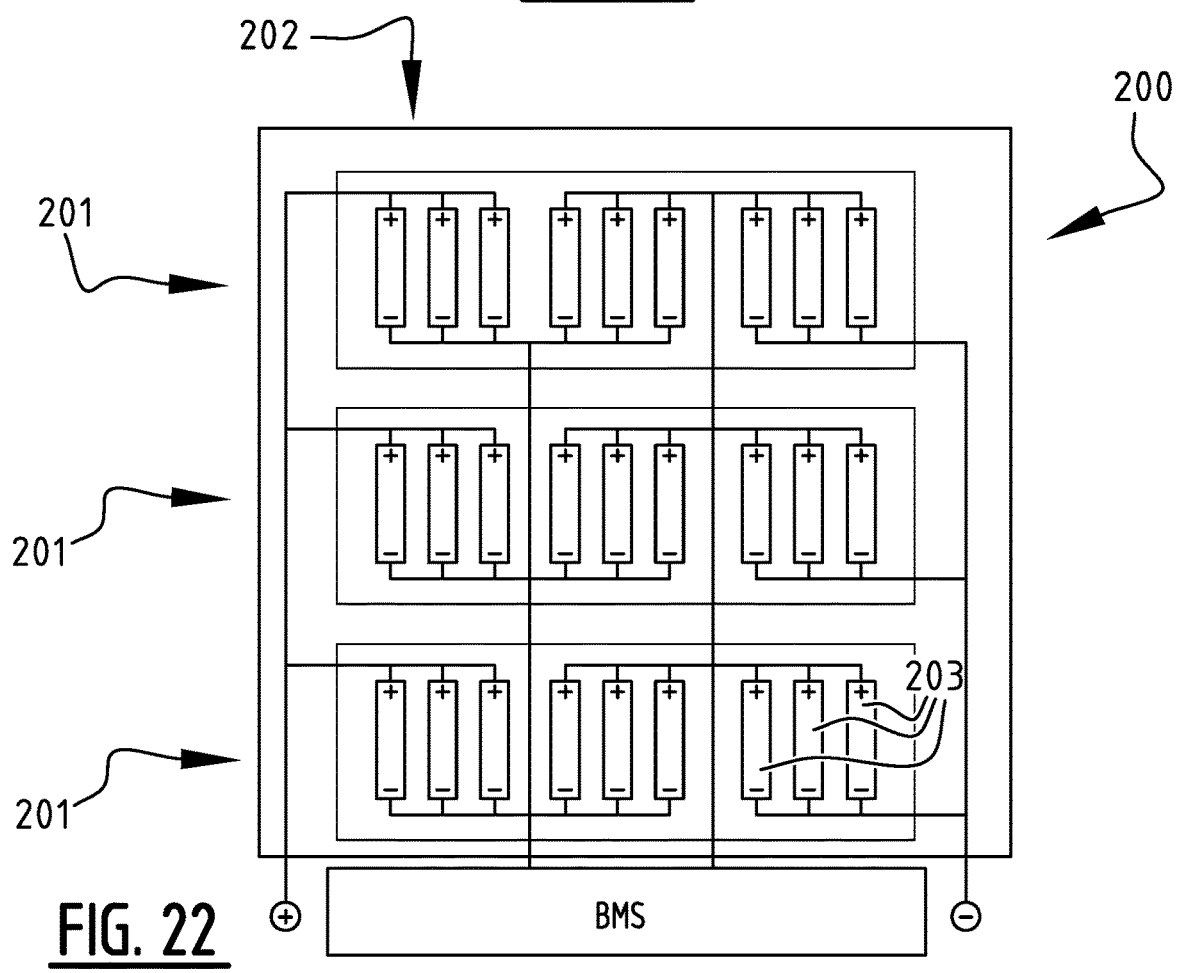
Figure 23:
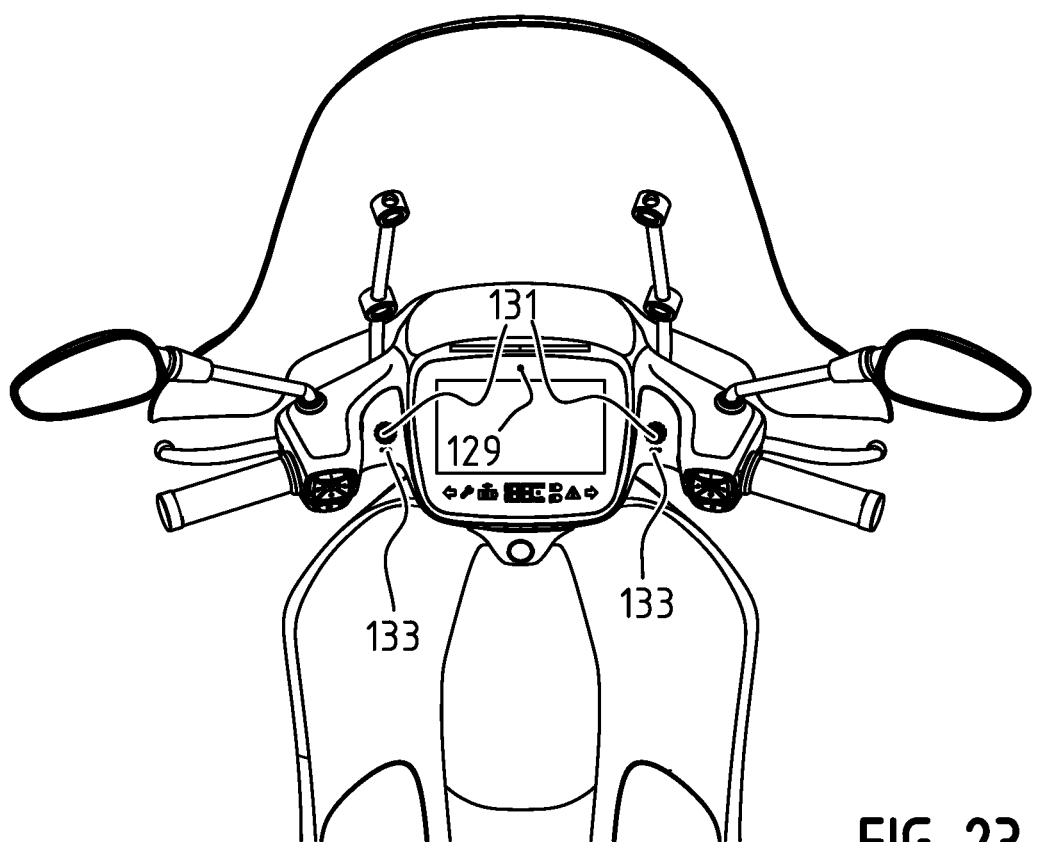
Figure 24:
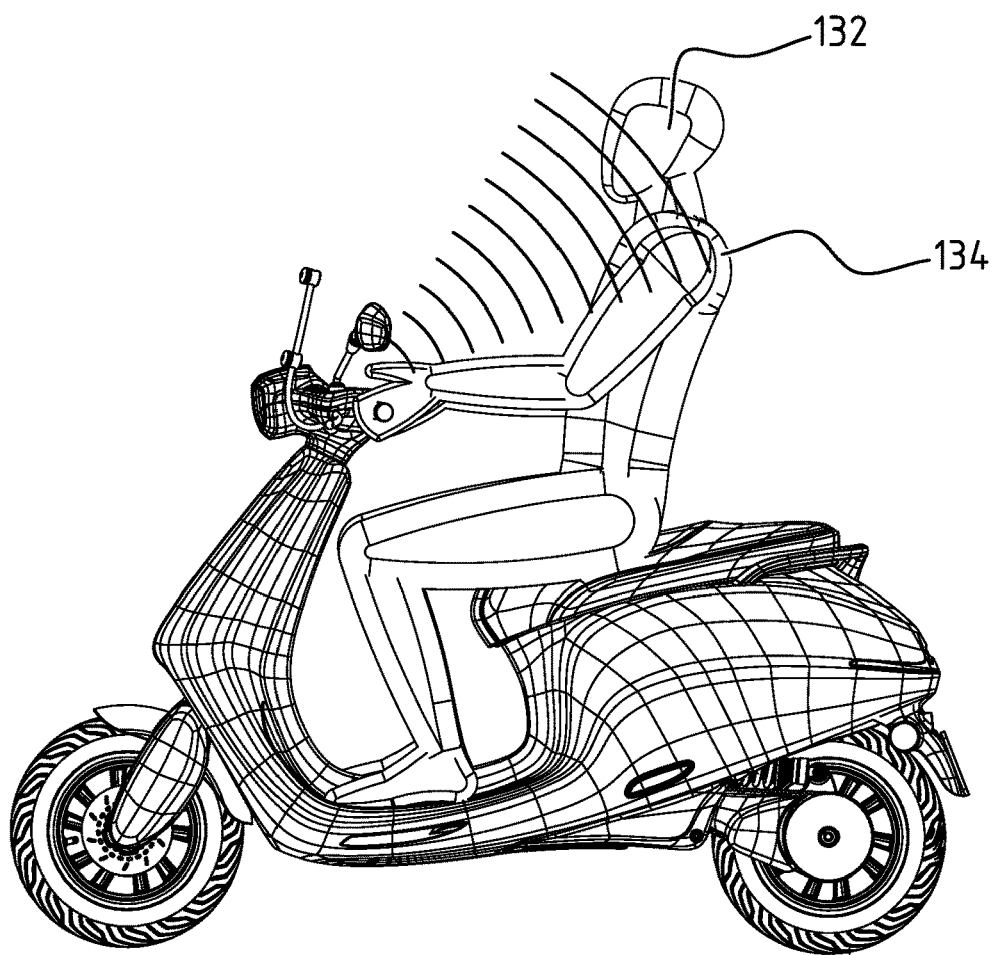
Figure 25:
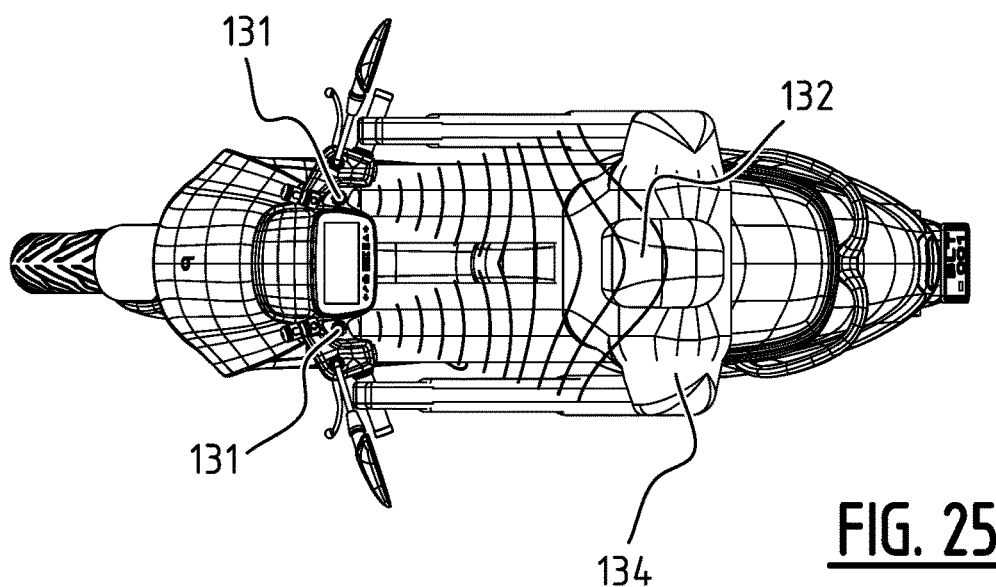

FIGS. 16A and 16B exhibit a locking mechanism;

FIG. 17 shows split architecture of control and monitoring of the vehicle;

FIGS. 18 and 19 show a two display configuration for images and icons;

FIG. 20 shows the remote control system based on a key fob;

FIG. 21 exhibits remote control by WPAN;

FIG. 22 shows a battery configuration;

FIG. 23 shows a frontal view on a dash board of a scooter of the present disclosure; and FIGS. 24 and 25 show sound characteristics.

In the embodiment described in the description below comprises a vehicle 1 of the electric motorcycle or scooter type. The skilled person will understand that the principles describes are also applicable to other vehicles types, such as trikes and motorcycles. Scooter 1 may be replaced by the general wording vehicle throughout the description.

Figure 1:
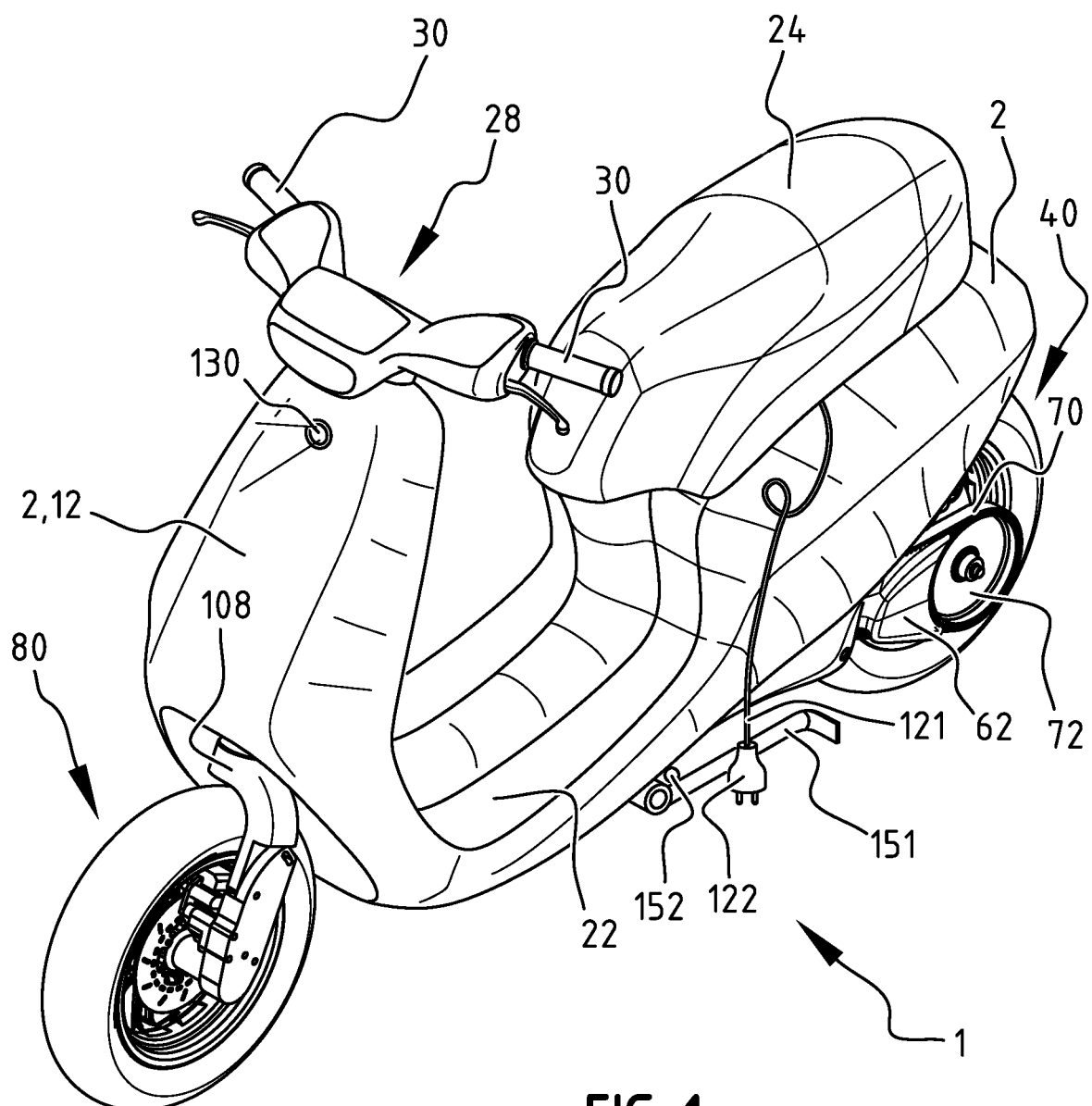
FIG. 1 is a perspective view of a scooter according to the present disclosure.

The scooter 1 shown in FIG. 1 comprises two wheels, i.e. a first wheel 40 and a second wheel 80. In the shown embodiment, first wheel 40 is a rear wheel of the scooter 1 that is drivable connected to a motor, more in particular an electric motor 114. The second wheel 80 is the front wheel of the scooter 1 that is steerable. Scooter 1 further comprises a battery pack 116.

Both wheels 40, 80 have a suspension, respectively a first wheel suspension 42 for the first wheel 40, and a second wheel suspension 82 for the second wheel 80.

A plastic shell 2 defines an envelope of the scooter 1, and the vehicle 1 is frameless. The suspensions 42, 82 of the at least two wheels 40, 80 are connected to the plastic shell 2. Contrary to conventional scooters, where the plastic shell only forms an esthetical outer body that is carried by an inner structural frame, the plastic shell 2 of the vehicle 1 forms a structural part of the vehicle 1. Therefore, a conventional metal inner frame for supporting the wheel suspensions 42, 82 can be omitted. When placing all the load carrying structural material at the most outer cross-sectional points in the structural part formed by the plastic shell 2, the stiffness and strength may be increased by up to four orders of magnitude. This allows for a reduction in the overall weight of the vehicle 1 and a tremendous increase in internal space whilst simultaneously increasing strength and stiffness. Due to the weight reduction, a faster acceleration and increased range are obtained with the same drive train, thereby reducing costs and increasing the resource efficiency of the vehicle 1. Due to the internal space increase there is room for a up to six times larger battery pack 116 and up to six times larger storage space. Because less material is used for a lighter vehicle 1, costs of the vehicle 1 can also be further reduced.

Figure 2:
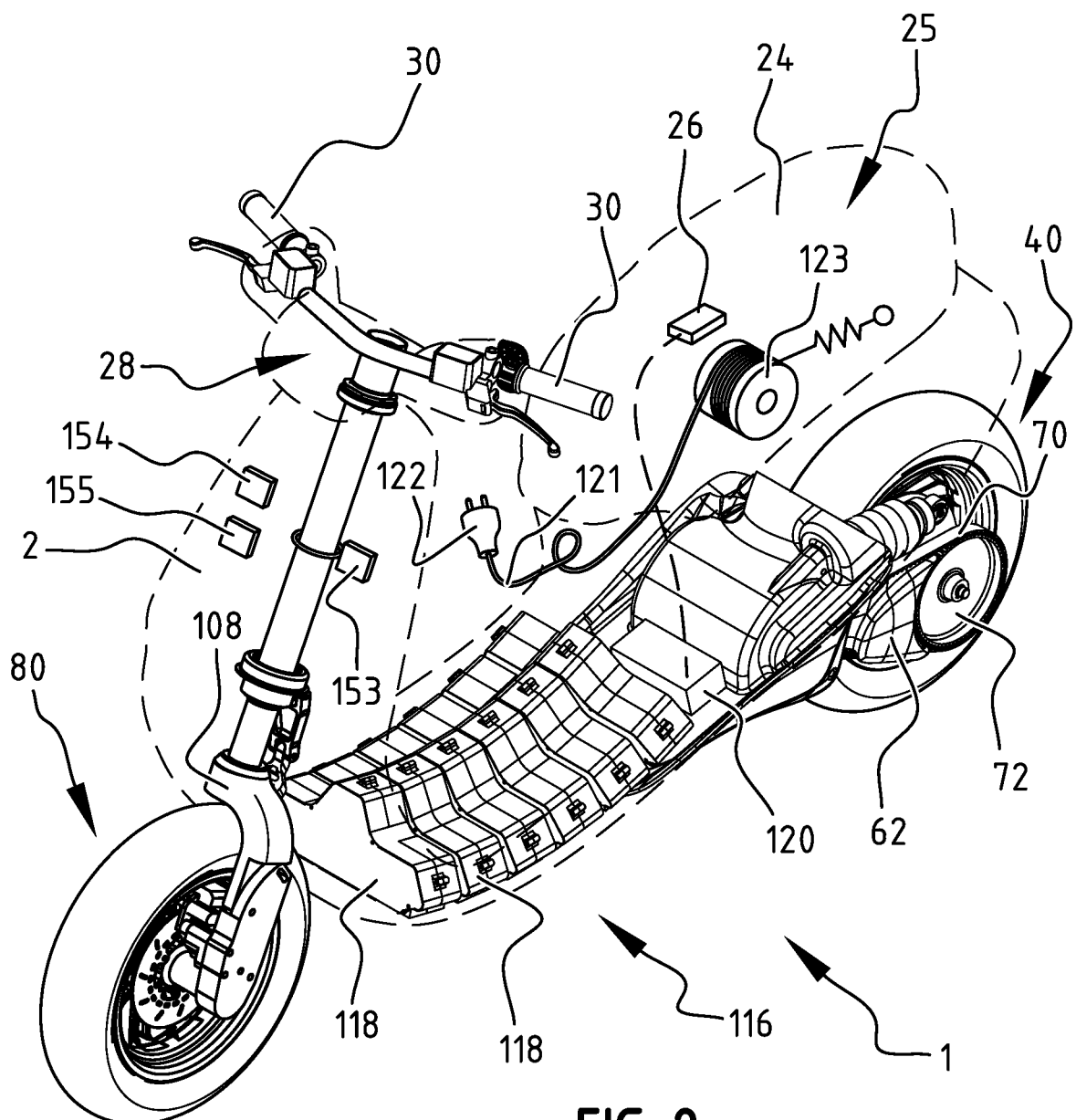
FIG. 2 is a perspective view of the scooter of FIG. 1, wherein the plastic shell is made transparent.

In order to provide a user with the flexibility to adapt the performance to his/her needs, battery pack 116 preferably comprises modular battery modules 118 (FIG. 2). A single large battery of sufficient capacity is often large and rect-angular and hard to accommodate in the interior of the scooter body, as a scooter body is often curved to provide a streamlined impression. By providing a plurality of smaller modules 118, the individual and combined battery modules may be easier to accommodate in the interior contour of the scooter body, optionally even in several distinct locations. The battery 116 is arranged under a footrest 22 of scooter 1, and can be accessed or even removed or replaced by lifting seating 24.

Suitable materials for the plastic shell 2 are e.g. fiber-reinforced polymers, such as carbon, glass, aramid, Dyneema®, and other fibers in a thermo-hardening or thermoplastic matrix.

Plastic shell 2 of scooter 1 comprises a first wheel casing 18 for accommodating rear wheel 40, and a second wheel casing 20 for accommodating front wheel 80.

Preferably, at least one of the wheels 40, 80 comprises a shock absorber 44, 84. In the shown embodiment, rear wheel 40 is provided with a shock absorber 44, and front wheel 80 is provided with a shock absorber 84. By using shock absorbers 44, 84, the peak forces that are transferred from the wheel suspensions 42, 82 to the plastic shell 2 during use of said vehicle 1, are reduced. Hence, the peak loads experienced by the plastic shell 2 are reduced.

In the shown embodiment, the suspensions 42, 82 of both wheels 40, 80 comprise at least one connector with a support surface 50, 88, 94 that abuts against a corresponding abutment surface 4, 6, 8 of the plastic shell.

Figure 3:
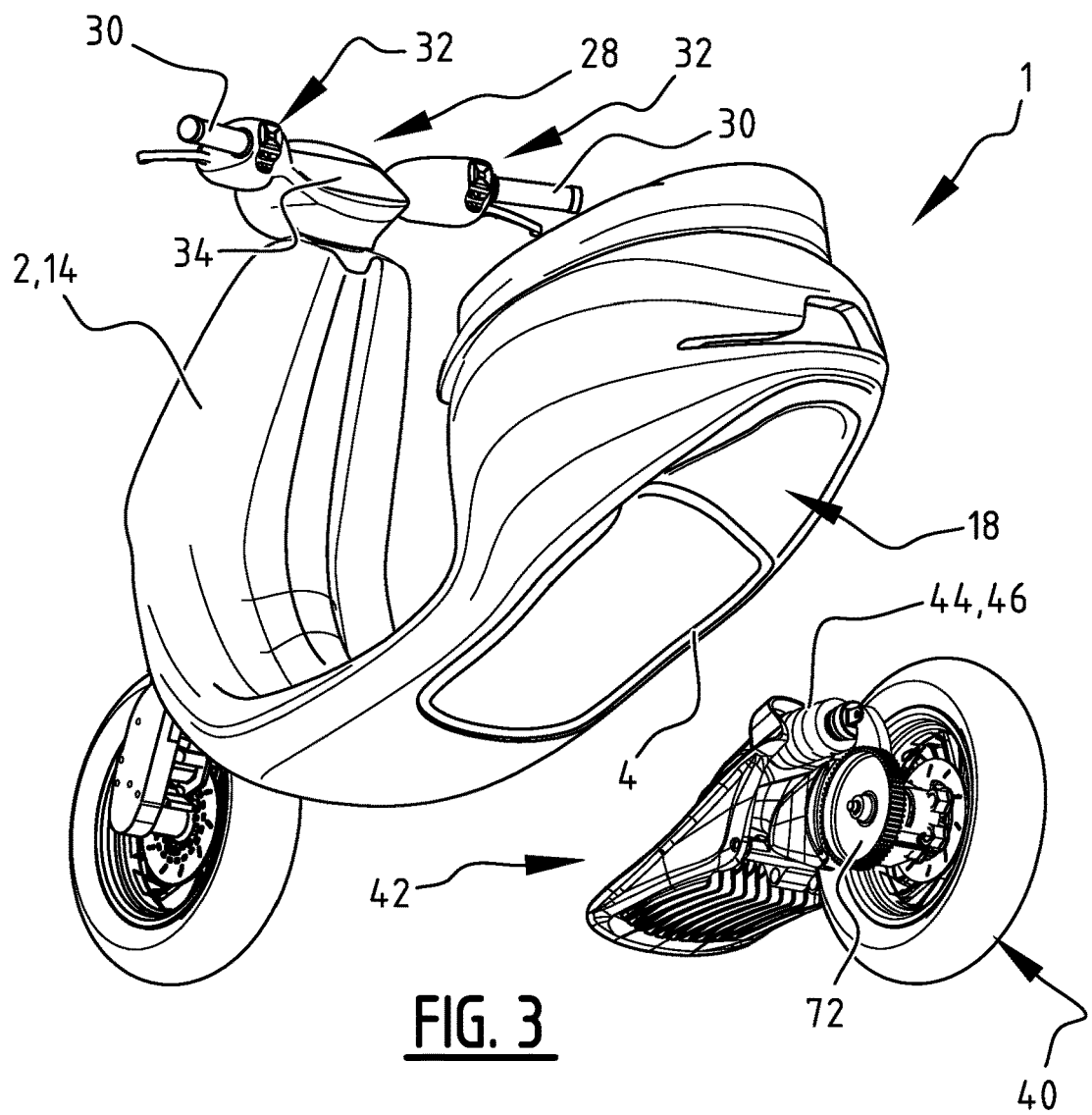
FIG. 3 is an exploded view of the scooter of FIGS. 1 and 2 from below, wherein a baseplate with drive train, swing arm and rear wheel suspension are shown at a distance from the scooter.
Figure 5:
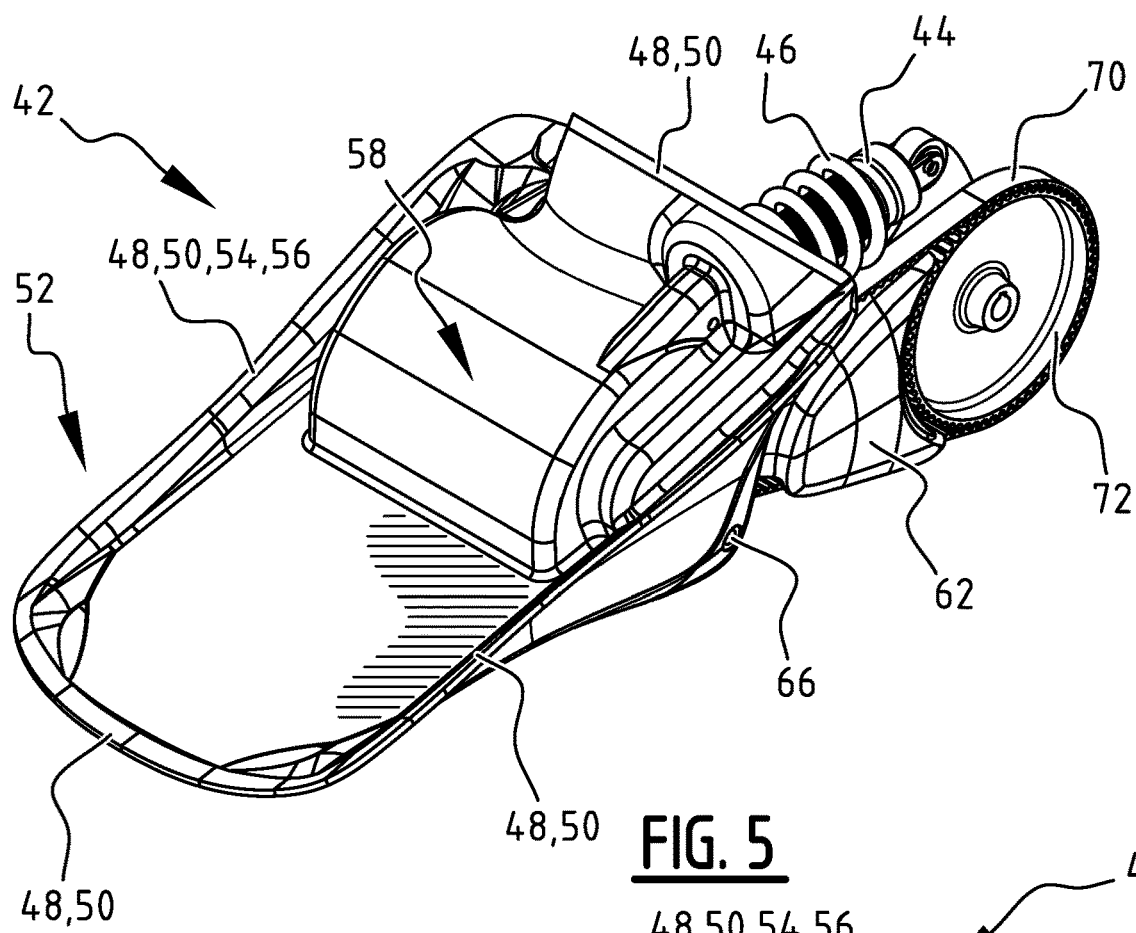
FIG. 5 shows a perspective view from above of the baseplate with drive train, swing arm and rear wheel suspension of FIG. 3.

The suspension 42 of the rear wheel 40 comprises a support surface 50 that forms a connector 48 (FIG. 5). The support surface 50 of the rear wheel 40 abuts against a first rear abutment surface 4 of the plastic shell 2 (FIG. 3).

Figure 10:
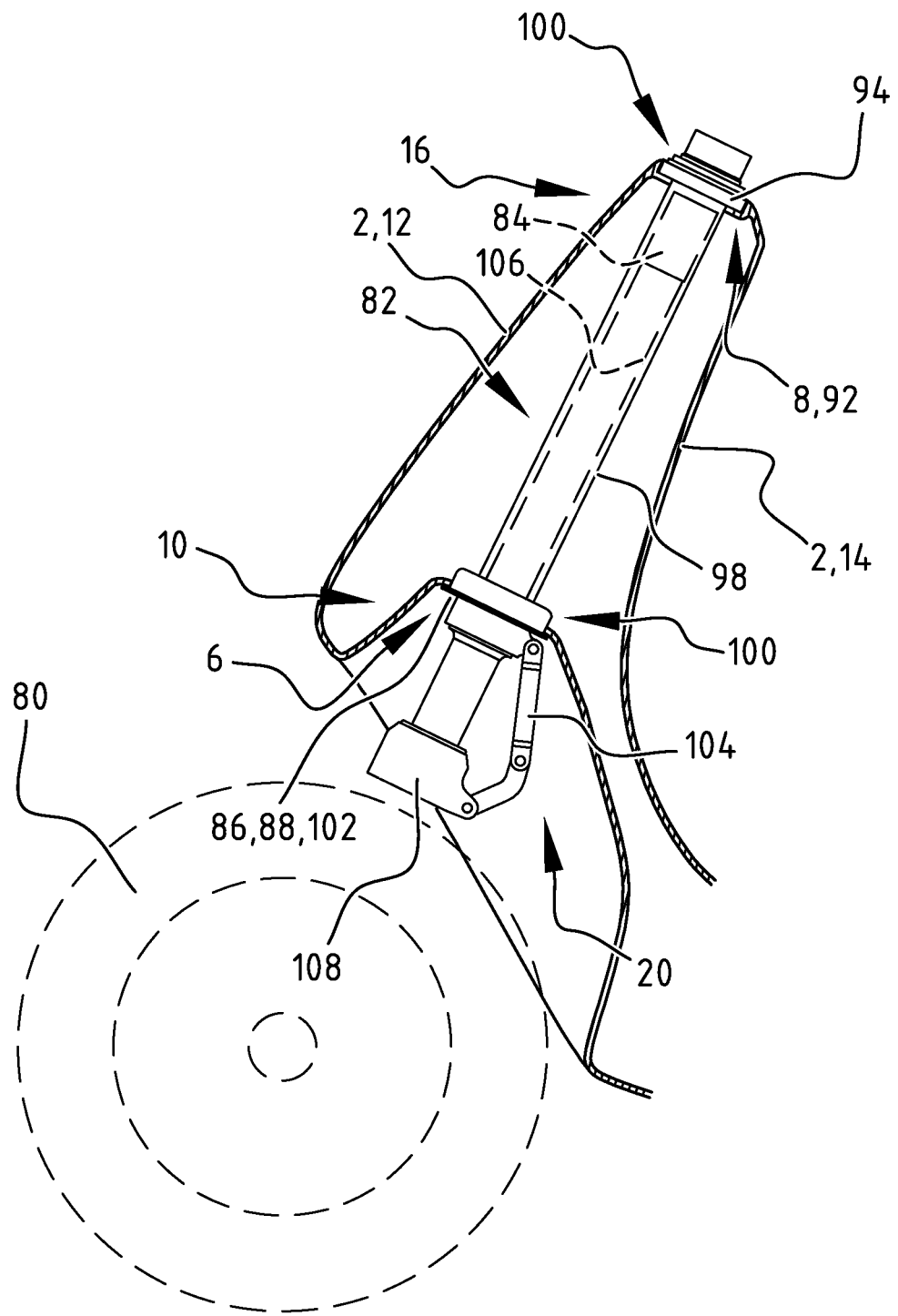
FIG. 10 shows a cross sectional view of the front of the scooter of FIG. 1.

The suspension 82 of the front wheel 80 comprises two support surfaces 88, 94 (FIG. 10). A first support surface 88 forms a first connector 86, and abuts against a first front abutment surface 6 of the plastic shell 2. A second support surface 94 forms a second connector 92, and abuts against a second front abutment surface 8 of the plastic shell 2.

The support surfaces 50, 88, 94 and their corresponding abutment surfaces 4, 6, 8 of the plastic shell 2 comprise a substantially complementary form, allowing for an optimal force transfer from the suspensions 42, 82 into the plastic shell 2.

Figure 7:
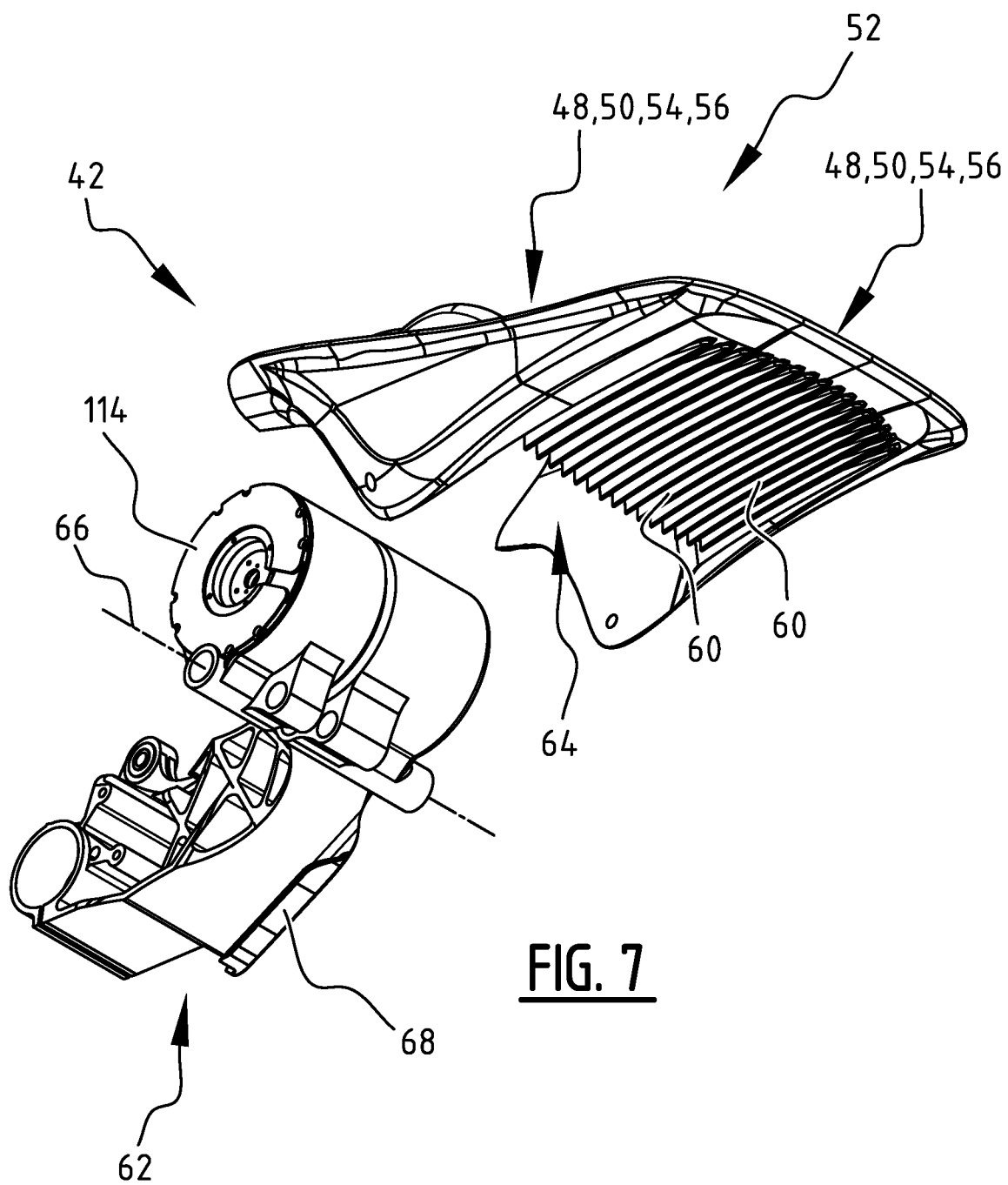
FIG. 7 shows a perspective exploded view from FIG. 6, wherein baseplate and swingarm are taken apart.
Figure 8:
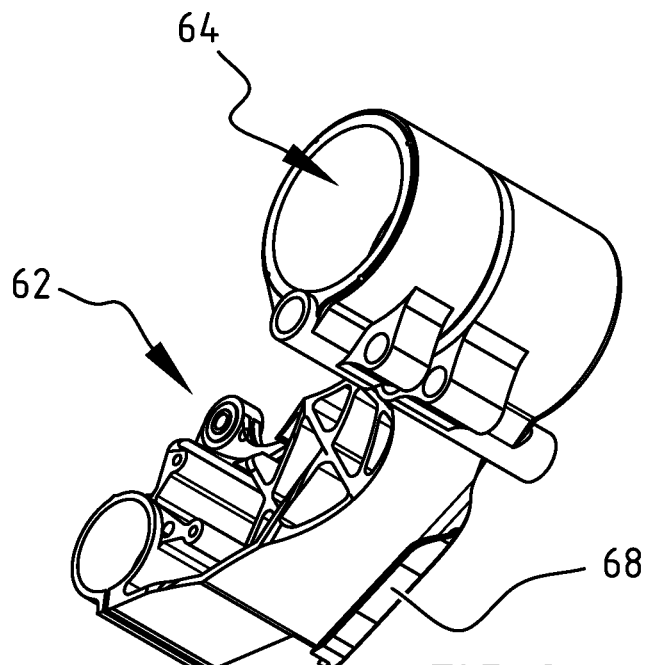
FIGS. 8 and 9 show a perspective view of the swing arm.
Figure 9:
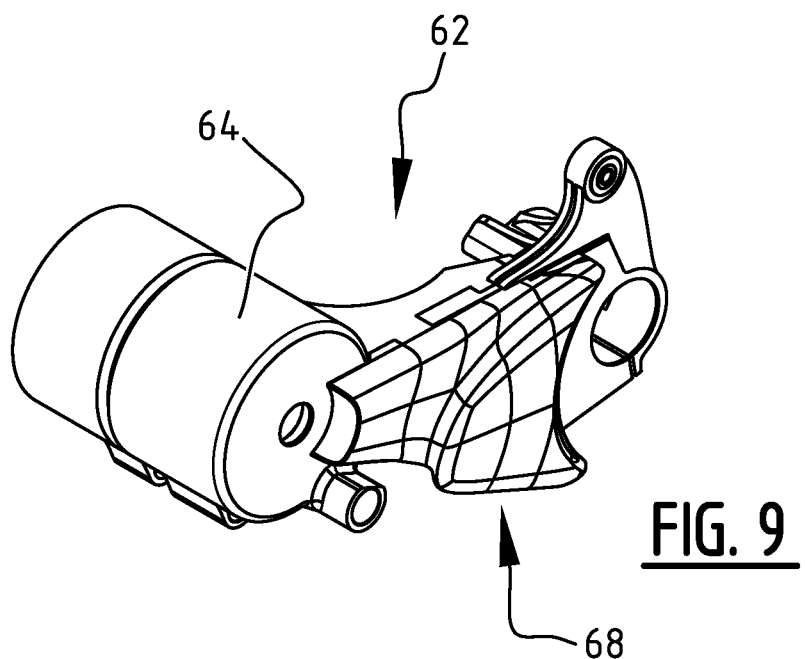

The suspension 42 of the at least one driven wheel 40 comprises a swing arm 62 with an integrated motor housing 64 (FIGS. 7-9). The motor housing 64 is configured to accommodate the electric motor 114. Integrating the motor housing 64 with the swing arm 62 into a single part has several advantages. Firstly, the number of components is reduced, simplifying assembly of the vehicle 1. Secondly, the entire heat capacity of the rear swing arm 62 material may now be functional as a heat sink for the motor 114, creating a substantial larger heat sink and a larger heat dissipation surface. This reduces the need for active cooling of the motor 114. Thirdly, the distance between the motor 114 and pulley 72 is constant, offering a reliable drive arrangement. Moreover, the placement of the pivot axis 66 of the rear swing arm 62 balances the weight of the motor 114 against the weight of the rear part of the swing arm 62 (with the wheel), which drastically lowers the unsprung weight, thereby greatly increasing comfort through spring and dampening response.

The motor housing 64 in the swing arm 62 has been developed to hold different motor 114 sizes, allowing for the electric motor 114 to be modular, such that it may be upgraded or downgraded dependent on the required performance, without requiring additional tooling for manufacturing the motor 114. This is achieved by keeping the diameter of the motor 114 constant, but varying the length of the motor 114 and therefore the power and performance in line with the requirements. This greatly increases the utilization of the production line and allows for a motor range that accounts for the global distribution in speed requirements, again increasing total resource efficiency.

The battery pack 116 may be modular, in such a way that increasing or decreasing the number of modules 118 in the battery pack 116 does not affect the nominal voltage of the battery pack, and additional electronics or control mechanisms are not required to guarantee safe operation. This property of a constant nominal voltage is highly desired since power consuming parts are specified according to, and perform optimal at, a certain voltage. Connecting the battery modules 118 in series, as opposed to connecting battery modules 118 in parallel, would multiply the voltage by the number of battery modules 118. The latter results in a battery voltage spectrum that is too broad to optimal dimension the power consuming devices of the vehicle. However, connecting the modules in parallel, without costly power management electronics, is dangerous because of the in-rush currents between battery modules 118 and other undesirable effects that can occur because of a (sudden) difference in module voltage caused by the malfunctioning of a cell or the differences in internal resistance of cells. Therefore, battery pack 116 may comprise battery modules 118 that are interconnected using detachable electric connections that connect cell clusters one to X of a first battery module to Y respectively (e.g. a first cell cluster in a first battery module 118 connects with a first cell cluster in a second battery module 118, which in turn connects with a first cell cluster in a third battery module 118 and so forth until the Ys battery module 118). X denotes the number of cell clusters per battery module 118 and Y is the total number of battery modules 118. The result is that every independent voltage level of the connected battery modules 118 (together forming the battery pack 116) is interconnected, generating a constant nominal voltage that doesn't require additional power management electronics per module to guarantee safe operation. In order to increase the safety level of the battery pack 116, every individual cell is double fused by means of an aluminium interconnection (between cell and cell cluster busbars) that is dimensioned in such a way that it will fuse in case a current exceeds a certain level. Thanks to this configuration of the battery pack 116, a user may up- or downgrade the number of battery modules 118 in scooter 1, effectively increasing or decreasing the range as needed (e.g. because of a change in daily commuting distance). Furthermore, in case of malfunction of one of the battery modules 118, it is also possible to only replace the battery module 188 that is defect.

Swing arm 62 supports rear wheel 40 of scooter 1 that is driven via a drive belt 70 and pulley 72. Swing arm 62 is provided with an integrated belt guard 68. The integrated belt guard 68 protects the driver's feet and fingers from the belt and eliminates the need for a separate protector.

Figure 6:
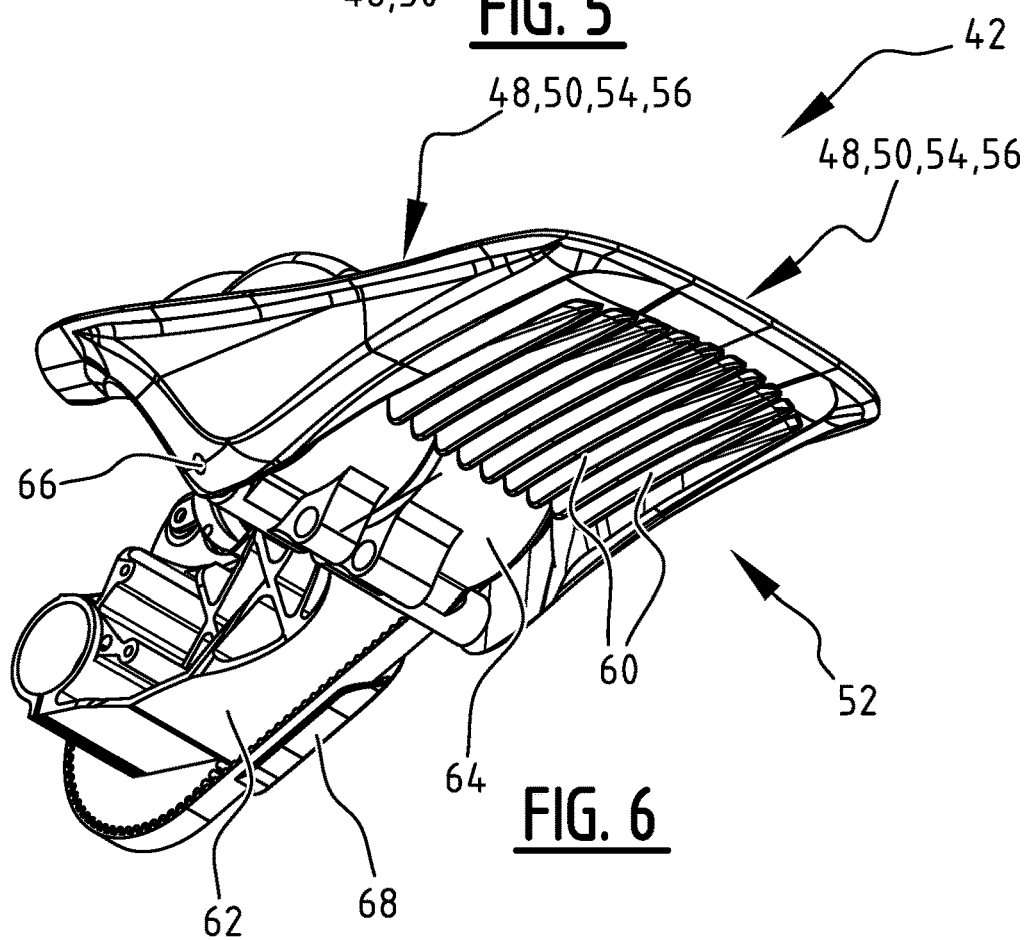
FIG. 6 shows a perspective view from below of the baseplate on the right side and the drive train, swing arm and rear wheel suspension of FIG. 5.

The connector 48 of suspension 42 of rear wheel 40 comprises a base plate 52, and the swing arm 62 is pivotally connected to the base plate 52. The pivot axis 66 is shown in FIGS. 5 and 6. A flange 56 of the base plate 52 forms the support surface 50 of the connector 48. In the shown embodiment, this flange 56 extends along three edges 54 of the base plate 52, i.e. two side edges and a front edge. These three edges substantially define a U-form of said flange 56.

Preferably, such a flange 56 extends along at least two edges of the base plate. Said flange 56 furthermore preferably forms a support surface 50 that comprises at least one of a O, U, V, H, or I form. It is noted that a rectangle with an intermediate rib is considered to comprise an H form with added square connections between the ends of adjacent long ribs, i.e. it at least comprises an H form and additional ribs. If flange 56 extends along all edges of the circumference of said base plate 52, a substantially hermetic sealing may be obtained, thereby e.g. protecting one or more than one electronic component 120 that is arranged on the base plate 52 from moisture and sealing the bottom side of the plastic shell 2.

The engineering design of the base plate 52 has been optimized to allow for the most ideal and shortest force paths possible within this configuration. The spring 46 and shock absorber 44 connect with the baseplate 52 at pivot 47. The distance between the pivot point 47 of the spring 46 and shock absorber 44 on the one hand and the pivot axis 66 of rear swing arm 62 on the other hand has been optimized by arranging the rear spring 46 parallel to the swing arm 62 and arranging the front spring mounting point as close as possible to the side of the electric motor 114 to provide the shortest load path and the most compact assembly. In order to achieve the shortest possible load path and compact assembly, the rear spring 46 is pivotally arranged on top of the swing arm 62 to create an arm of sufficient length to reduce the needed spring force and peak loads on the swing arm 62, base plate 52 and plastic shell 2. With this setup additional usable space is created in the buddy space 25 below seating 24. The creation of the short load path allows for the integration of the pivot point 47 of the spring 46 and shock absorber 44 on the one hand and pivot point 66 of rear swing arm 62 on the other hand, which allows for a single base plate 52, preferably made of aluminium, with drastically more accurate tolerances and conformity of production. Besides further reducing parts, this reduces the required production tolerance on the plastic shell 2 and only requires a single production step to obtain desired production tolerances, which in turn reduces production costs.

Additionally, the above described engineering design of the base plate 52 increases stiffness and strength and allows for a horizontal load transfer of the spring 44 force into the already existing geometry of base plate 52, reducing the amount of additional material required to absorb this force.

Forces experienced by the rear wheel suspension 42 during driving are mainly related to bumps in the road and driving forces. Both forces are transmitted via swing arm 62 and shock absorber 44 towards the base plate 52. Base plate 52 transfers these forces towards the support surface 50, which evenly distributes the forces over a relatively large area before they are transferred to the plastic shell 2. Abutment surface 4 of plastic shell 2 is designed such that the forces are received as compressive and tensile forces that are mainly oriented along a wall of said plastic shell 2 (instead of transverse or oblique to said wall).

FIGS. 5 and 6 show that the motor housing 64 of the swing arm 62 is accommodated in a motor accommodation 58 of the base plate 52.

Preferably, the motor housing 64 and/or the base plate 52 are made of metal. Metals are strong and comprise excellent heat conductive characteristics, allowing for a transfer of heat from the motor housing 64 and/or base plate 52 to the environment. The motor housing 64 and/or base plate 52 may thus function as a heat sink. This heat sink functions as both a thermal mass and a heat dissipation surface. This allows the heat to be efficiently passively transferred to the environment, drastically reducing the need for active cooling and eliminating complex service intensive components.

More preferably, both the motor housing 64 and base plate are made of metal. The entire rear swing arm 62, which houses the motor 114 in motor housing 64, functions as a heat sink for the heat generated by the electric motor 114. The heat is then dissipated to the airflow around the rear swing arm 62.

However, the airflow comes in via cooling surfaces, e.g. the cooling fins 60 or a different surface increasing solution such as a (not shown) radiator, arranged at the underside of the baseplate 52. The fins 60 create a larger heat transfer surface for dissipating heat to the air and are in direct thermal contact with the one or more than one heat generating electronic component 120 that are thermally mounted on top of baseplate 52. Such electronic component 120 may comprise one or more of a battery management system, a motor controller, a charger, a (DC/DC) converter and an Electronic Control Unit (ECU) 120. During riding, the airflow will effectively cool the electronic components 120. Since the maximum temperature range for such electronic components 120 is lower than that the maximum temperature range of the electric motor 114, the airflow coming out of the fins 60 is still sufficient to cool the motor 114.

FIG. 10 shows a cross sectional view of the front of the scooter 1, wherein the plastic shell 2 defines at least one funnel-shaped portion 10, 16 with a support surface 88, 94 configured to receive a head tube 98 of scooter 1.

As can be seen in FIG. 10, the plastic shell 2 defines two funnel-shaped portions 10, 16. Each funnel-shaped portion 10, 16 comprises a support surface 88, 94 configured to receive the head tube 98 of the vehicle. The two funnel-shaped portions 10, 16 are aligned and the head tube 98 extends between both funnel-shaped portions 10, 16. Due to the distance between the two funnel-shaped-portions 10, 16, head tube 98 is rigidly supported by the plastic shell 2, so that riding forces such as bumps and braking forces are readily absorbed by wheel suspension 82 of front wheel 80.

A first funnel-shaped portion 10 is a lower funnel-shaped portion 10 arranged in a wheel casing 20 defined by the plastic shell 2. A second funnel-shaped portion 16 is an upper funnel-shaped 16 portion arranged between panels of the plastic shell 2 defining a leg shield 14 and a front panel 12 of scooter 1.

A plastic shell 2 is far better able to absorb a tensile and compressive loads substantially oriented along a wall of said plastic shell 2 than it is in absorbing loads that are applied substantially transverse or oblique to said wall. The funnel-shaped portions 10, 16 ensure that plastic shell 2 is mainly loaded by tensile and compressive forces that are substantially oriented along the walls of said plastic shell 2.

The head tube 98 is a hollow tube that is arranged in bearings 100, wherein the head tube 98 is rotatable relative to the plastic shell 2. An inner tube 106 comprising a spring and shock absorber 84 is rotatable and slideable arranged in head tube 98 (FIG. 10). A fork 108 connects the front wheel 80 to said inner tube 106. When a rider turns steer 28, head tube 98 is rotated in bearing 100. Via link 104, also the fork 108 and front wheel 80 are rotated.

Forces experienced by the front wheel suspension 82 during riding are mainly related to bumps in the road and braking forces. Both situations are now described.

When driving over a bump, a vertical displacement is exerted on the wheel 80. The resulting upward force is transferred to the fork 108, which in turn transfers it into the shock absorber 84, thereby reducing and dampening the peak loads. This shock absorber 84 then transfers the resulting remainder of dampened force into the head tube 98. Via the bearings 100, this force is then guided into the plastic shell 2 to the support surface 88 that forms first connector 86. Plate 102 forms this support surface 88 and abuts against first front abutment surface 6 of plastic shell 2. The walls of the plastic shell 2 of lower funnel-shaped portion 10 are mainly loaded by tensile forces substantially oriented along said the wall.

During braking with front wheel 80, brake system absorbs the kinetic energy of the vehicle 1 via front wheel 80. This will result in a deceleration force caused by the vehicle mass and experienced by front wheel 80. The resulting is force transferred into the plastic shell 2 in two places, i.e. the first front abutment surface 6 and the second front abutment surface 8. This results in the following force distribution throughout the shell.

Head tube 98 will try to pivot around the first (i.e. lower) funnel-shaped portion 10. Thus, upper end of head tube 98 will move in forward direction relative to front wheel 80 (i.e. to the left in FIG. 10).

Front panel 12 will absorb a compressive force that is substantially oriented along said front panel 12, and, to the contrary, leg shield 14 will absorb a tensile force that is substantially oriented along said leg shield 14. Hence, front panel 12 and leg shield 14 are mainly loaded in a preferred direction, i.e. in a wall of said plastic shell 2 (instead of transverse thereto). Said deceleration will also induce a weight transfer from back to front leading to a larger vertical force on front wheel 80. This will have an opposite, but less substantial, effect on forces induced in plastic shell 2.

Figure 11:
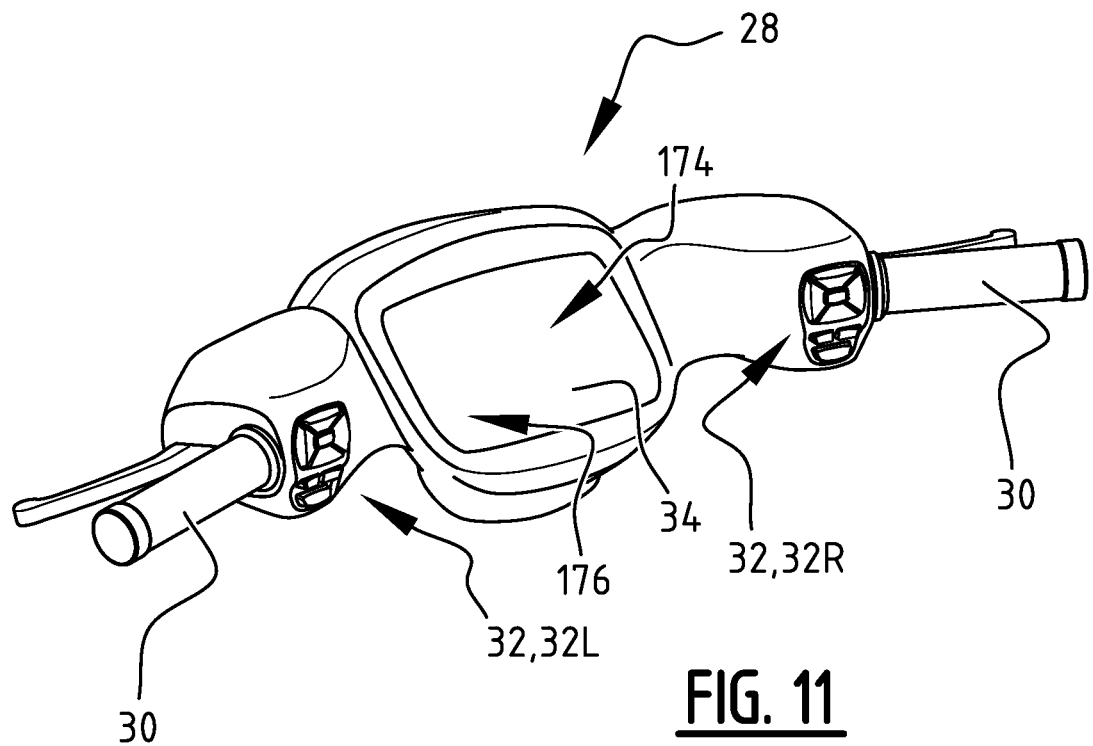
FIG. 11 shows a perspective view of the cockpit with handle bars, touch screen, control interfaces and indicator icons.
Figure 12:
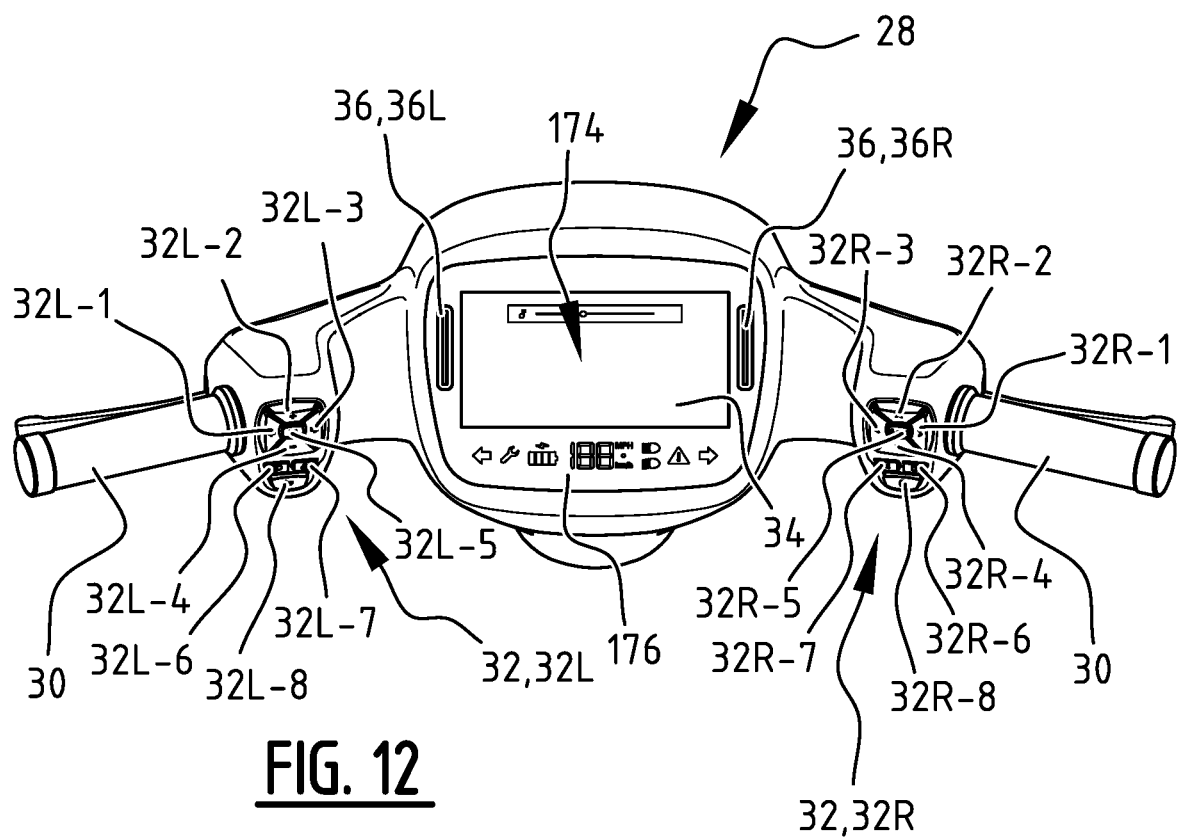
FIG. 12 shows a drivers view of the cockpit with handle bars, touch screen, control interfaces and indicator icons.
Figure 13A:
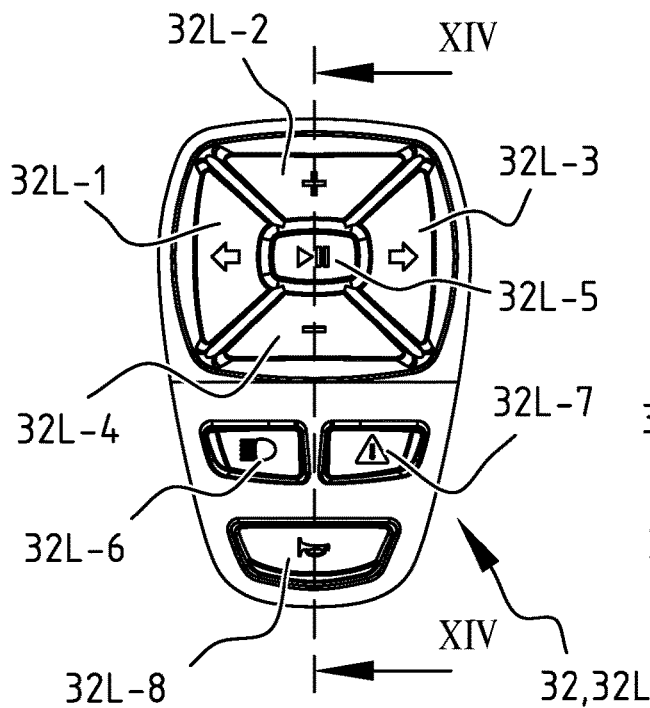
FIG. 13A is a detailed view of the left control interface.
Figure 13B:
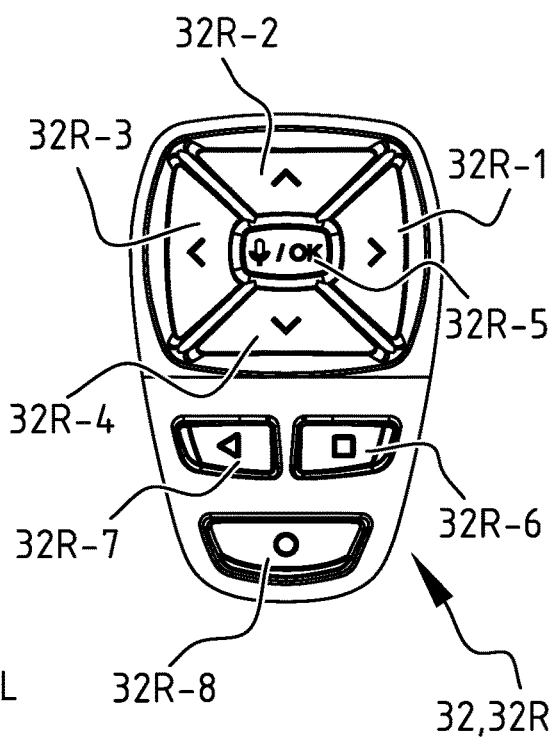
FIG. 13B is a detailed view of the right control interface.
Figure 14:
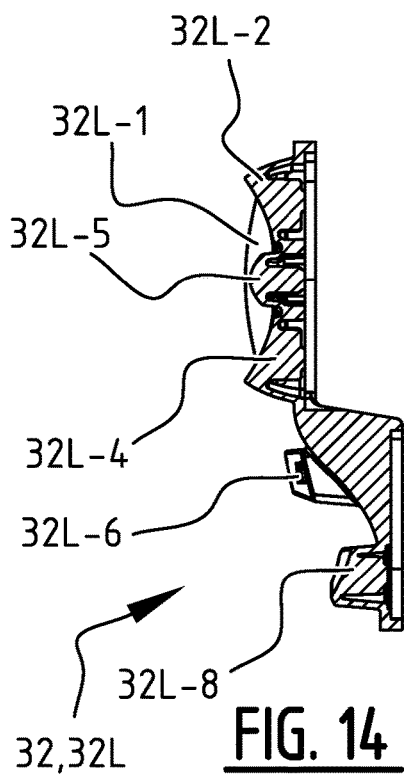
FIG. 14 shows a side view of the left control interface of FIG. 13A.
Figure 15:
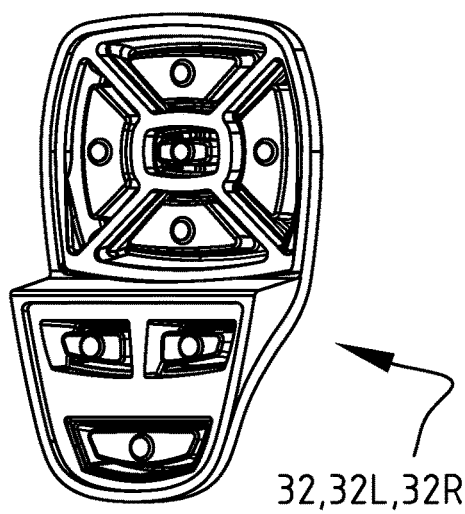
FIG. 15 shows a perspective view of a control interface from the rear.

As shown in FIGS. 11 and 12, vehicle 1 comprises a display 34 with a user interface such as an operating system or application. The steer 28 of the scooter 1 comprises one or more control interfaces 32. In the figures, a left control interface 32L and a right control interface 32R are shown. The control interfaces 32 are designed to safely control all the functions required to control the entire operating system and one or more than one application running in the operating system and displayed on display 34. Potentially, the control interfaces may additionally or alternatively be used for control over other personal devices, which are connected via e.g. Bluetooth. The one or more control interfaces 32 are arranged so that the driver never has to take his/her hands of the steer 28 and that the controls can be used blindly. Detailed views of the left control interface 32L and right control interface 32R are shown in FIGS. 13A and 13B respectively. Although FIG. 14 shows a side view of the left control interface 32L of FIG. 13A, it is remarked that the right control interface comprises a similar configuration. A structural rubber of the control interface 32, which is shown in the perspective view of FIG. 15, has been dimensioned and constructed in such a way as to allow a user to clearly identify the current position of the thumb via touch, and furthermore allow for blind navigation amongst the control buttons 32L-1 to 32L-8 and 32R-1 to 32R-8. This is achieved by a domed structure as can be seen in the side view of FIG. 14. The thickness of the walls of the buttons 32L-1 to 32L-8 and 32R-1 to 32R-8 has been constructed in such a way as to be susceptible to sufficient pressure to allow for control and recognition of a successful press, even with gloved hands, and during rain and diverse driving conditions. The button interface 32L on the left side of the steer 28 has eight buttons of which five buttons have the following standard scooter functions: left blinker 32L-1, right blinker 32L3, high/low beam selection 32L-6, alarm lights 32L-7, horn 32L-8. Buttons 32L-22, 32L-4 and 32L-5 are used for volume control and music/video playback of music/video and have the capability to control the volume of both the built in speakers 36 (left speaker 36L and right speaker 36R next to the display 34 that is preferably a touchscreen) in the scooter 1 and/or the volume of a connected personal device, such as a smartphone. Preferably, the connection is a wireless connection, e.g. via Bluetooth. Preferably, a user can control the playback of any audio/video stream in both the touchscreen 34 and the connected personal device. Button 32L-2 is used for volume up, button 32L-4 is volume down and button 32L-5 is used for play, pause and next and previous songs, the latter two by pressing two or three times respectively.

The right control interface 32R on the right side of the steer 28 comprises also eight buttons in a similar lay-out, but preferably with vastly different functions. The buttons 32R-1 to 32R-8 on the right are preferably all specifically configured to control the operating system and all applications that it can run whilst riding. As noted above, also other personal devices may be controlled using the buttons 32, for example devices that are connected via Bluetooth or any other connection, such as an MP3 player or any alternative device. Preferably, the buttons 32R-1 to 32R-4 are all directional controls to navigate through the different applications and their respective focusable user interface (UI) elements. Button 32R-1 is left, 32R-2 is up, 32R-3 is right and 32R-4 is down. These navigation buttons 32R-1-32R-4 may be replaced by a single swivel button, which may resemble a short joy stick, such as ones encountered in some embodiments of keyboards usually of laptop computers. Button 32R-5 is used for clicking an UI element that has been selected with a single click or opening search when no element is selected. When button 32R-5 is pressed longer, the voice command opens and a user may then control the actions with voice commands. Button 32R-6 is used to go back a level, button 32R-7 is used to bring up the menu and open additional options within an application. Button 32R-8 is used to return to the home screen from any open application or other screen.

Said buttons 32R-1 to 32R-8 also have tactile feedback so the operator does not need to look whilst operating them to know when he/she clicked them successfully. To help the user learn and understand the button functions, buttons 32L-1 to 32L-8 and 32R-1 to 32R-8 may comprise icons (FIG. 12). Preferably, the icons light up in low light conditions, thereby improving usability and safety whilst driving. To achieve this, backlighting may be employed, using for example selectively activated LED's incorporated in the domed structure, with through shining portions corresponding with the icons inserted in front elements or covers of buttons 32. Also buttons 32L-1 to 32L-8 may be provided with a similar tactile feedback.

Display 34 is preferably a touch screen, so that it may also be used for controlling the operating system for situations that are considered safe to use by the operating system. The available options may comprise speed, road situation or other external variables (eg wind, temperature, location etc.), with full options in standstill of the scooter, to a limited number of options while driving at moderate speeds, and with even further limited or no options at higher speeds. Preferably, full control of the touch functions is disabled when the vehicle moves not to tempt the operator to take hands of the steer 28. The primary safety this setup enables is that it a user no longer needs to take a phone out of his/her pocket to accept/deny calls, navigate, play music or control any other app powered function that would otherwise result in the user taking his/her hands of the handles 30. This setup may prevent many lethal accidents, since to date using an app on a phone whilst riding is cause of death number one in traffic accidents in various European countries.

In an embodiment a scooter according the present disclosure may be such, that the display 34 is configured to mirror or emulate a (part of) information being shown on a display of personal portable or mobile device of a user, in that the display shows user output for a user, the same as a mobile device of the user, or a part thereof. This is to say, that buttons on the steer can serve to operate the user's mobile device, instead of operating the operating system of the scooter. Then, display can be used to display program or app or operating system information to the user instead of display thereof on a screen of the mobile device.

Yet further, the accommodation for and of the display may comprise an adapter enabling a user to couple a personal portable or mobile device with the scooter. This way hard wired control from the user's mobile device controller may function to operate the scooter and programs and/or apps running on the mobile device. In such an embodiment, the personal portable or mobile device may be provided with programs and/or apps to execute functions related to the scooter and/or programs and/or apps, replacing a scooter based controller. An advantage of this measure is that the scooter may not be driven without the proper user device being connected to it, either by hardwire or by wireless connection, providing for example theft protection and also simplifying then scooter itself by obviating a need for a processor therein, in particular for more entertainment related applications, so that such functions and applications are not run on a processor dedicated to the scooter and where such a processor may be subject to strict legal and testing requirements.

The operating system may be connected to the internet through wireless technologies such as 3G, 4G and Wi-Fi. The connection with the internet may consist of multiple independent access points. A first access point may connect directly with the public internet and a further secured access point may connect with a backend server that has the capability to connect, update and transfer data from and to all connected devices remotely.

If vehicle 1 is a vehicle that is driven with an electric motor 114, it is even silent when turned on. In order to prevent that someone may turn the throttle in right handle 30 while the vehicle 1 is turned on, a safeguard is provided. After all, turning the throttle would result in the vehicle 1 driving away, which is only desired when a driver is sitting in or on vehicle 1.

As shown in FIG. 2, scooter 1 comprises a seating 24. A sensor 26, e.g. a pressure sensor, is arranged under the seating 24. This sensor 26 is configured to sense a presence of a driver on the seating 24. Sensor 26 is connected to a control unit of said vehicle 1, e.g. electronic component 120. This control component 120 may be a motor controller that is configured to allow the electric motor 114 to drive said vehicle 1 only when a user is sitting on said seating. The sensor 26 may further register weight of a load (driver, passenger, and/or cargo) to enable the control 120 or 171 to adapt characteristics of the scooter 1, such as throttle response; motor torque; motor speed; speed; maximum current drawn from energy storage system; braking characteristics, such as distribution, maximum braking power, anti blocking system parameters or braking; adjusting vehicle dynamics, such suspension parameters (stiffness, damping coefficient), and the like, to (a change in) weight of a load on the scooter. For instance with more weight, stiffness may be increased, damping may be increased, throttle response may be tuned to be less steep, so as not to let a passenger fall off the scooter, but motor power may be increased so as to provide sufficient power to transport both the driver and a passenger, relative to such and/or other scooter characteristics for a low load on the scooter. This is one of many examples of safety enhancing features of the present disclosure.

Additionally or alternatively, a sensor 152—shown in FIG. 1—may be provided to detect whether a side stand 151 of the scooter is extended. The stand 151 is purposefully extended by the user, when parking the scooter, to keep the scooter upright. With the stand 151 in an extended state, based on a signal from the sensor 152 to detect the extended state of the stand 151, the controller 120 may prevent the motor from being engaged or at least that the scooter is set in motion.

In specific embodiments, a scooter according to the present disclosure may exhibit yet further features, as set out below. Although the described embodiments all relate to electrically driven scooters, some of the following features may well be implemented in a combustion based scooter as an alternative.

Electronics & Software Appscooter

The scooter may comprise a system and embody a method for safe and secure monitoring and control of smart vehicles, in particular scooter 1. As examples, reference is made here to issues and aspects, which will be described herein below, of:

Scooter electronics and software:
  Separation central (vehicle) controller between central (vehicle) controller and rich user interface controller, which results in distinct processors, but where a combined display is preferably provided
  Electronics architecture
  Phone connection
  App Platform
  Communication architecture including both open internet as well as communication to the backoffice, and describe security aspects
  APN separation
  How to secure the system

Specification of Electronics and Software

Broad Definition

Embodiments of the present disclosure may relate to a system for controlling and monitoring (the electrical systems of) a vehicle, in particular the scooter embodiment of to the present disclosure.

Control means may be configured to change the state of the vehicle—also referred to as scooter characteristics—in the broadest sense, based on safety and/or operational and/or environmental considerations and/or a driver state, for which a large number of sensors may be deployed. Controlling the vehicle includes switching lights on and off, and/or switching power (sub-)systems on and off, changing configuration parameters of subsystems, changing control parameters to affect a change in speed (including throttle control), changing control parameters to affect the way the vehicle responds to driver inputs (e.g. settings of throttle mapping).

Monitoring means may be configured to read/monitor any aspect of the state of the vehicle, the environment and the driver. Monitoring includes reading/monitoring the current value of all sensors on board the vehicle, reading/monitoring the diagnostic information of the various electrical systems, et cetera. Additionally or alternatively, external variables may be detected, such as wind, temperature, environmental light and the like.

The vehicle may be a part of a vehicle sharing system and a mobility platform. The present disclosure therefore includes remote control and monitoring of the vehicle, as a part of such a vehicle sharing system and mobility platform.

Specification of Controls and Displays

Control inputs are a set of buttons within thumb reach of the driver. In addition, other buttons may be placed around the vehicle such as a button for opening and closing compartments, buttons for starting and stopping vehicle systems. In addition, a touch-enabled display 174, 176 running a graphical user interface can be a control input. In addition, a remote control system can be used, of which several variants are described below.

The monitoring data is used by the vehicle systems itself for its own coordination of tasks and ensuring proper operation. In addition, a subset of the available monitoring data is stored inside the vehicle for diagnostic purposes. In addition, the monitoring data may be presented to the driver via the one or more than one display 34, 174, 176. In addition, a subset or a complete set of available monitoring data can be sent to the remote control and monitoring system for real-time monitoring, potentially for improving control and other algorithms. This monitoring data can also be used for anti-theft purposes.

The interface presented on the one or more than one display to the user contains preferably all information required for nominal operation of the vehicle. This interface may be governed for example by international legal requirements and/or other rules and guidelines, which may require that specific tell-tale signs and indicators are shown to the driver. For a two-wheeled vehicle of class Lie these are two tell-tale signs for the left and right direction indicators, a tell-tale for low-beam headlight, a tell-tale for high-beam headlight and a hazard warning signal. Tell-tales may be icons on the display 176 in FIG. 19. In addition, a speed indicator can be added. In addition, depending on the type of vehicle, other icons for vehicle-specific functions can be added.

The type of display required by these international legal or other requirements, rules and guidelines can be implemented as a segment display 176 with discrete icons, connected to a computing device with discrete digital outputs. Alternatively, the display can be implemented as a dot-matrix display and connected to a computing device with a video driver, or simply a light source to illuminate a preformed icon associated with such nominal functions of the scooter in the display area 176.

With the current state of technology, users have come to expect rich graphical user interfaces. Therefore, the present disclosure may comprise a dot-matrix display that offers a rich graphical user interface on display 174 to the driver. The ability to show a rich graphical user interface enables more functions to be included in the user interface. In case multiple segment or dot-matrix displays are used they may be integrated behind a single cover glass to present a uniform look to the user, as shown in FIGS. 18 and 19. In embodiments of the present disclosure, the interface provided to the user may include diagnostic information that is more detailed than the required tell-tales and indicators. In case of a non-nominal event, in addition to showing the basic hazard warning signal on the segment display, the rich user interface can be used to identify specific non-nominal events and access information regarding the steps that can be used or performed to solve such events (e.g. perform some action, contact maintenance service, reset scooter and/or its control, et cetera).

The rich graphical user interface on display 174 may additionally or alternatively also present drive-assist functions, such as maps, navigation and a map or directory showing places of interest. Such a presentation may be shown on an additional display and/or in a single display for instance temporarily replacing the tell tales or icons (except legally required information, for example while a navigation function is active). Additionally or alternatively, the display may present the user with information about an active safety being engaged and any related warnings, for example to limit speed in view of low temperatures and risk of icing on roads or of high winds. Also any other information from the sensors and cameras that pick up information that is helpful to alert the driver such as an alert when the traffic light changes colour to go on red, orange or green (seen with the front camera) and the driver has not yet moved in X seconds or the driver facing camera picking up that the driver is not looking forward and has not started braking when there is a clear need for breaking by indication of an object approaching from the front (seen with front camera). Or when the rear camera finds someone approaching quickly from the rear-left you can for example give a red blinking light warning on the bottom left of the screen or even show a live feed of the object (similar to a parking sensor, but then a bit further away).

In addition, the platform is preferably open for adding additional applications to the vehicle software. In this way, the user and/or third parties can add functionality to the vehicle.

Controllers and Split Architecture

Handling of the control input buttons or other user inputs for example via touch sensitivity of the display screen 174, coordination of the vehicle systems and collection and distribution of monitoring data may be performed by one or more computing devices or controllers on board of the scooter. Additionally or alternatively, a mobile device of a user can be linked or coupled to the scooter to embody (a part of) the controller and/or display, in particular for more entertainment related functions, while the scooter itself may comprise a basic processor to drive the display 176. In this way, if the processor of a user's mobile device is made the core for driving the scooter, also the nominal functions in display area 176, the scooter may remain inoperable as long as the user's mobile device is separate from the scooter, enabling a highly effective theft prevention. In the system design for these controllers, the following aspects can and sometimes must be considered.

Presently, it not anticipated considered realistic that a user's mobile device may replace a scooter based processor for the scooter's basic functions. For example, legally required icons on the display 176 are not expected to be allowed to be driven by a user's mobile device, which could fail, contrary to stringent legal and testing requirements relating to the icons and the basic scooter functions these icons represent. Sooner such icons and functions are expected to remain under control of the central (vehicle) controller of the scooter. However, the use case for the mobile device would be to drive the display 174 and that the user's mobile device can be the host for all software displaying on the rich user interface 174. In such a case, a rich user interface controller on the scooter can be reduced to merely a video driver for this display, or—if the video driver can be embodied in the user's mobile device—omitted entirely.

International legal requirements on vehicles place strict requirements on drive-related functions, including display of required tell-tale signs, icons and indicators. Such legal requirements include requirements that the vehicle should still function normally while subject to strong RF radiation. This makes it more difficult to implement the display for the required tell-tale signs, icons and indicators using dot-matrix displays compared to segment displays.

While not yet legally required, the current trend is that software running on these controllers is subject to strict checks to increase reliability and lower risk of accidents. Such checking is more complex, when the size and complexity of the software image of the controller increases, up to the point of becoming not feasible.

In the present day, people expect better quality displays. For dot-matrix displays this means that it needs to be of high resolution (for example at least 800×480 pixels for a 7" screen). When implementing a user's mobile device, such as a smart phone or tablet computer, most often such requirements will be met, or at least a user will be confronted with a display to which he/she is accustomed. A computing device that can control a dot-matrix display requires such computing power that smaller-scale, high-speed electronics are needed to realize this. Smaller-scale, high-speed electronics are more sensitive to strong RF radiation.

Considering these requirements and the fact that the computing power and software required for controlling the drive-related functions and controlling the required aspects of the display is much less than the computing power and software required for the rich user interface, in the present disclosure, two controllers and two displays may be used:
1. the central controller, for controlling and monitoring all drive-related functions, connected to a segment display 176, showing at least the required tell-tales and indicators, and
2. the user interface controller, connected to a touch-enabled dot-matrix display, offering the rich graphical user interface on the touch-enabled dot-matrix display 174.

In embodiments of the present disclosure, the two displays are attached to a single cover plate 182 in FIGS. 18 and 19 so that they appear to form a single display from the driver's perspective.

Remote Control and Monitoring Systems

The control and monitoring system described so far may be extended with any one or more than one of a number of remote control and monitoring systems:
key fob, connection using dedicated RF transceivers;
personal electronic device, such as a smart phone, or other mobile device, connection using Wireless Personal Area Network technology (e.g. Bluetooth, NFC);
personal electronic device, such as a smart phone, or other mobile device, connection using Wireless Local Area Network technology;
internet-connected server, connection using cellular network technology or Wireless Local Area Network technology (e.g. WiFi) and via the internet;

A key fob is a first possible method for remote control of the vehicle, and does not depend on any other device or system. The other listed methods involve third-party equipment and services, such as a personal electronic device (e.g. mobile phone, smart watch), an internet-connected server and an internet connection.

As explained in the scope definition, the remote control and monitoring system is preferred for a vehicle sharing system and mobility platform. Internet connection may be required for key transfer and fleet management, and the personal electronic device may be used for locking and unlocking the vehicle. By allowing the use of a person's own personal electronic device, which they carry already, and instant remote key programming, a vehicle sharing system is enabled that does not require the transfer of physical elements such as a key fob.

Key Fob

The first discussed remote control system can make use of a key fob. The key fob may comprise: a radio transceiver, a secure identification element that cannot be copied, a computing device with a firmware image loaded containing the necessary logic, zero or more buttons, and a battery. On the vehicle, a radio transceiver is connected to the central controller, and a software module is added to the software image of the central controller containing the required functions to connect the radio transceiver to the lock control software module in the central controller software.

The security of the key fob relies on a cryptographic key pair comprising a private key and a public key. The private key is derived from the identification element that cannot be copied and forever remains inside the key fob. The public key can be shared across unsecure communication channels. Even if the concept of a key fob as such, or if cryptographic techniques as such are prior art, then the specific application of cryptographic techniques in secure key storage and methods for updating this secure key storage in the context of the present disclosure are considered new.

Before the key fob can be used to operate vehicle controls, the key fob must be paired with a particular vehicle. The result of the pairing is that the public key of the key fob is stored inside a secure key storage inside the vehicle, or with equivalent security, a cryptographically secure checksum of a public key list in unsecure storage is stored in secure storage to avoid tampering with the unsecure storage, both methods referred to as secure key storage. This secure key storage is protected from modification, copying and other unauthorised manipulation, except when the vehicle is put in a software state allowing such manipulation by the user, or by a command that is verified to come from a previously authorized source that is programmed into the vehicle at manufacturing. Other ways for authorised secure key manipulation may be employed as an addition or an alternative.

Pairing of the key fob can be performed in either of at least two ways, such as:

1. A first way requires the key fob to be within communication range of the vehicle. The central controller in the vehicle is put in a special software state for accepting a new key. Then a button on the key fob is pushed. The key fob sends a message to the vehicle, and the vehicle responds with a special challenge message that indicates to the key fob that it must send its public key. The key fob responds to this challenge message by sending its public key. The vehicle stores this public key in the secure key storage.

2. In a second way the public key of the key fob is added to said list of authorized key fob public keys by a programming command from a remote device, e.g. making use of—if available—and internet or private back office connection. The programming command contains the public key and a cryptographic signature that undeniably proves that the programming command was generated by a previously authorized source.

It is noted that only few systems must be authorized to generate key programming commands, as the security of the vehicle depends on the ability to protect the list of key fob public keys from unauthorized manipulation or modification.

During nominal operation the key fob works as follows. For the key fob to work, it must be within communication range of the vehicle. When a button on the key fob is pushed, the key fob broadcasts a message and it includes the code of the button that was pushed (every button on the key fob has its own unique code). Security may be implemented either by including a cryptographic signature based on the key fob's private key already in this message, or alternatively or in addition a challenge-response mechanism may be used that works as follows: when the vehicle receives this message, it responds by broadcasting a challenge message. The key fob receives this message, executes a cryptographically secure computation based on the challenge message sent by the vehicle as well as its private key, and broadcasts the result of the computation and includes again the code of the button. The vehicle receives this message and runs a cryptographic algorithm on the message using the public key received from the key fob (stored inside the vehicle using one of the methods described below) to verify the identity of the key fob. The cryptographic functions used in both methods must be such that the identity of the key fob is undeniably verified when the message verification succeeds, and conversely that message verification always fails when any other device than the authentic key fob is used. The preferred part of this method is that the key fob must respond to the challenge sent by the vehicle and that the challenge varies every time to prevent replay attacks. Different cryptographic algorithms and key types can be used to achieve the same result. In a future system the vehicle may also broadcast a challenge message without the key fob having to send a message first, which does not affect validity of other steps of the above described method.

It is noted here that the aforementioned approach may entail additional security against relay attacks. This may be mitigated by requiring that a hardwired or icon button needs to be pressed by the user, but when using a passive system that does not need a button press it may be necessary to impose a time constraint with respect to arrival of the message, which is in the order of nanoseconds. A skilled person in the art will have no hesitation on how to implement such features.

It is noted here that the aforementioned approach may entail additional security against replay attacks, where a distinction is noted between replay and relay attacks. This is obtained by including a time-varying or randomly generated value in the message that is also included in the signature computation, so that for the same button press the message is always different and cannot be reused by an adversary.

Personal Electronic Device Using WPAN

Pairing could be performed based on conventional mechanisms, for example prior art Bluetooth. It is noted that pairing can allow the use of this connection to control functions in and of the scooter.

Personal Electronic Device Using WLAN

Pairing and key fob may function or can be achieved in a similar manner. Further description thereof is therefore omitted here. However, it is noted here additionally that it is possible to use such a connection to control functions in and of the scooter. It is not considered obvious, since the use of WLAN is not so convenient for this.

Remote Control and Monitoring Via Cellular Network

As explained above, remote control and monitoring via internet connection is a strongly preferred part of the envisaged vehicle sharing and mobility platform to which the present disclosure is not limited. Internet connection may be realized by including a cellular communication device in the vehicle or using a link to a cellular communication of a user's mobile device, a WiFi connection (appearing in public places more and more) or the like. Such a cellular communication device can be connected to one or several controllers inside the vehicle. In case only one controller is connected to the cellular communication device, communication intended for other controllers must be passed via an available interconnection inside the vehicle or of the user's mobile device. This may be performed by including a software module on the controller connected to the cellular communication device that performs this gateway function. This is explained in a dedicated section detail below.

Given the internet connection and the high-resolution dot-matrix display powered by a high-performance computing device, functions similar to a mobile phone can be performed on the vehicle itself, if not that control functions of the vehicle can be executed on the user's mobile device and/or that apps or other software on the user's device can be controlled from the vehicle. It is noted in the latter named respect allows the user's device to be operated from for example the operation buttons on the steering wheel or by using a touch screen as the display. Not all of these functions are essential for driving, but the fact that these functions can be performed on the vehicle and controlled by the touch-enabled display and the buttons in the handle bars increases safety for the driver if otherwise these functions would be performed by the driver using a personal electronic device which is then to be handled in addition to handling the vehicle. However, when a user's personal electronic device can be placed in a docking accommodation, when the user intends to use the vehicle, this option may be considered to be more viable.

A high-speed internet connection may be required for at least some of such functions. In a particular instance of the present disclosure, the cellular communication device is connected directly to the user interface controller in order to not cause non-essential functions to hamper the central controller in performing drive-related functions. A second aspect for this preferred choice is that some user interface controllers come with such cellular communication device already integrated.

Remote control and monitoring may be implemented as follows. The software of each of the controllers may contain a software module that is capable of listening and responding to specific control commands, or to act as a relay for control and monitoring messages for another controller. In a particular embodiment of the present disclosure where the cellular communication device is connected to the user interface controller, the user interface controller passes on monitoring and control messages for all other controllers in the vehicle using for example a communication bus between the user interface controller and the central controller. The central controller may then act as a relay for control and monitoring messages for other vehicle systems.

Some control messages may be considered to be security-critical. Such messages may include locking and unlocking the vehicle, where remote programming of such additional remote control devices can be used to lock and unlock the vehicle, and control messages that are relayed to other vehicle systems. The fact that the user interface controller acts as a relay for such security-critical control messages could form a security risk, where it is noted that an average skilled person in for example the field of communications security can address such issues without any inventive labour. Such risks may be dealt with by applying encryption and/or cryptographic signatures in combination with randomly generated challenges to prevent tampering by the gateway controller. Further reference is made in this context to the next section of the present disclosure for solutions to such risks, which next section actually describes a related invention.

Securing and Authenticating Control Messages

To prevent unauthorized execution of control messages received via the cellular network or via a communication bus, every control message is assigned into one or more than one of a plurality of message classes. Every controller may comprise a list of allowed senders, and a control message is only accepted when the control message comes from an authorised sender on the list of allowed senders.

Control messages may be signed so that the receiver can verify the authenticity of the sender. Upon receiving a control message intended for a controller, it must first verify the signature of the control message. If signature verification fails, the message must be discarded. If signature verification succeeds, a selected class of control message is attributed to the control message read and the aforementioned list of authorizations is checked to determine whether the controller should accept control message of the attributed class from any sender from whom the control message originates.

Said list is preferably protected from unauthorized modification by storing the list in a secure area that can only be manipulated, changed or updated based on a particular programming command. This programming command may be attributed to a special dedicated message class. Only a few senders should have authorisation to execute commands to be handled in accordance with this dedicated message class.

It is noted here that the aforementioned approach may entail additional security against replay attacks, where a distinction is noted between replay and relay attacks. This is obtained by including a time-varying or randomly generated value in the message that is also included in the signature computation, so that for the same command the message is always different and cannot be reused by an adversary.

Connection Between Controllers: Security

According to embodiments of the present disclosure, control messages (some of which can be considered security-critical) may be exchanged between the central controller 120 and a secure server connected to the cellular network, with the user interface controller as a gateway, wherein the server may be connected to the cellular network via infrastructure of local mobile operators and the internet.

The private key for sending these control messages is preferably stored and securely maintained on the secure server. Then, since the user interface controller does not have the private key used for signing control messages, any modification through the user interface controller of the control message will lead to an invalid signature and therefore such a message will be discarded by the central controller. Any breach of security with respect to the user interface controller should therefore not lead to the user interface controller being able to send control messages. Any control messages that the user interface controller can issue will most preferably have to be signed using a private key that is specific to the user interface controller. The software of the user interface controller can then be responsible for protecting access to this private key.

In order to detect and protect against attacks, the device may keep track of numbers of failed signature verifications and includes this in monitoring data. Such numbers of failed signature verifications may indicate possible attempts at attacking the device and unauthorised access thereto.

In addition to employing sender authentication, encryption can be employed for messages that contain sensitive information. In this method, for every sender a cryptographic secret may be generated that can be particular to or be dedicated for the connection between the controller and that sender. The secret may be established and exchanged using an appropriate method for exchanging secrets across an unencrypted channel, for example such as a Diffie-Hellman key exchange protocol. The secret may then be stored in a secure key storage and cannot be taken out of the device. At the sender side all messages are encrypted with the shared secret and transmitted via the cellular network. On the receiver side the message is decrypted with the shared secret and then be processed further.

APN Separation

In embodiments according to the present disclosure where the user interface controller uses the cellular network connection for providing internet access to its various applications, it may act as a gateway for monitoring and control messages exchanged between the central controller and the secure server. At some point this traffic may have to be separated. In embodiments according to the present disclosure this may be done by creating at least two connections to the cellular network: at least one connection which has public internet access, and at least one connection which has a private and secured connection to the secure server. This separation can be implemented on the cellular network by using a different Access Point Name (APN) for each. On the controller one network device may be created for each connection. The network devices may have a different IP range. Traffic on the private network may have a private IP range. The network traffic for any application running on the gateway controller may be routed by the operating system depending on the IP address used when opening the network connection.

On the backend side of the cellular network, all private APN traffic may be sent to the secure server.

Securing Privacy-Sensitive Monitoring Messages

Further, monitoring messages may contain privacy-sensitive information such as location and identifiers that can be used to identify a person.

FIGS. 17, 20 show an embodiment of split architecture of the control and monitoring of the vehicle, comprising any combination of above described optional features, in particular: the central controller 171 and the user interface controller 172 connected via dedicated communication bus 173; the touch-enabled dot-matrix display 174 connected to the user interface controller 172 by video and touch communication bus 175; the icon segment display 176 connected to the central controller 171 by dedicated communication bus 177. In addition, the embodiment of this figure shows the set of control buttons 32 which can be located in various places on or in the vehicle. The other electrical systems 178 inside the vehicle are connected to the central controller by one or several communication busses 179. The type and number of these communication busses 179 is determined by the vehicle type. In addition, one or more remote control and monitoring systems 180 can be added to the system using connection 181. Connection 181 can be wireless. These remote control and monitoring systems can each be connected to either the central controller 171 via connection 181a, or to the user interface controller 172 via connection 181b, or both, depending on where the vehicle-end of the physical part of the communication link 181 is located. Sensors, like a GPS sensor 154 or a GNSS positioning device, a wheel speed sensor, an accelerometer or a gyroscope 155, a steering angle sensor 153, a motor torque sensor, and the like, can be connected via wired connections 179. Actually these sensors can also be connected to controller 172 or even a part of controller 172 (this is actually the case for the GNSS positioning device, it is integrated on the same module).

FIG. 18 shows the two displays: a touch-enabled dot-matrix display 174 and the icon segment display 176, connected to cover plate 182, which forms a uniform look to the driver. Both displays 174 and 176 are attached to the cover plate 182 by means of optical adhesive 183 and 184.

FIG. 19 shows a front view of the two displays 174 and 176. When glued to (or otherwise arranged behind) the same cover plate or glass 182, they form a uniform display for the user, while behind the front the displays 174, 176 are physically separated and connected to two different controllers 171 and 172 with different legal and testing requirements. For functions that are considered vital or essential for the operations of the scooter itself, more stringent legal and/or testing requirements may apply than for additional, more entertainment related functions. The more vital scooter functions are displayed in the embodiments of FIGS. 12 and 19 in a lower portion 176 of the combined display. This lower portion of the combined display may be embodied as a robust dot-matrix or LED-segment display. For example, icons of vital scooter functions may be pre-formed in said lower display portion 176, requiring only a backlight to be activated to relay to the user/driver that something is amiss with the scooter.

The more entertainment related functions may then be displayed in the higher display portion 174 for a rich user interface, for example embodied in the form of a touch screen, comparable with the screen of a smart phone, potentially under control of a smart phone or other user owned mobile device. The second display may be under control of a second controller, which may be formed by a CPU of the scooter or the like of a smart phone distinct or even separate from the scooter. Above it has already been noted that a processor distinct from the scooter is not quickly likely to be allowed to run the scooter's basic functions and icon display on display 174

By combining the display 174 with the rich user interface and the basic, robust and reliable display 176 with icons for vital scooter functions behind a common front or cover plate or glass, drivers will not need to be aware of the distinction between the types of functions and the legal and testing requirements and be confronted with a uniform and unitary display, while inventors of the present disclosure will not need to submit the processor and its software for the more entertainment related functions to the rigorous or stringent legal and testing requirements that apply to the processor for the scooter essential functions.

FIG. 20 shows the remote control system based on a key fob. It comprises of a key fob 185 and a compatible radio element inside the vehicle. The key fob 185 comprises: one or more buttons 32, connected to a computing device 187 using dedicated digital communication lines 188. The computing device 187 is connected to a radio transceiver 189 and its antenna 190 via a dedicated communication bus 191. The key fob 185 further comprises an identity element 192, that cannot be copied, which may be a separate component or integrated with the computing device 187 in a single package. When separate, the identity element 192 that cannot be copied is connected to the computing device 187 using a dedicated communication bus 193. The vehicle-end of the remote control connection comprises a radio transceiver 194 with antenna 195 located inside the vehicle 196 and connected to the central controller 197 using a dedicated communication bus 198. The radio transceiver 194 may also be integrated with the central controller 197. The radio transceivers 189 and 194 in the key fob 185 and the vehicle 196 form a wireless RF connection 199.

FIG. 21 shows the sequence diagram illustrating how the key fob 185 works when controlling vehicle 196 in its extensive form using the challenge-response mechanism.

FIG. 21 exhibits remote control by WPAN. Messages are exchanges via the WPAN.

A potential hierarchical set-up of the structure may be as follows:

- Overall scope listing contents of system and describing high-level connection between subsystems
- Central controller
  - Detail of central controller hardware
  - High-level function of central controller
- User interface controller
  - Detail of user interface controller hardware
  - High-level function of user interface controller
- Icon display
  - Further specification of icon display (list of tell-tales)
  - Further specification of icon display (speed indicator)
  - Further specification of icon display (battery charge level)
- Touch-enabled display
  - Detail of the touch-enabled display hardware
  - Function of the touch-enabled display
  - Detail of the touch controller
- Buttons for basic input
  - Detail of how the buttons for basic input are connected electrically
  - Detail of how the buttons are mounted on two/three-wheeled vehicles
- Interconnections:
  - Specification of how the user interface controller is controlled (touch screen)
  - Specification of how the user interface controller is controlled (buttons)
- Additional control and monitoring methods
- Add mobile phone
- Add personal area communication device
- Add cellular communication device
- Add local area communication device
- Add internet server
- Smart phone control
- Software of the user interface controller
- Drivers
- Operating system
- Way to update and customize the system
  - Apps
  - Remote firmware update
- Method for increased security and dealing with legal issues
- Separating between central controller and user interface controller
- Security features added to the system
- Front-facing camera, driver facing camera, rear facing camera or other vehicle-mounted camera
- GNSS location
- Accelerometer
- Locks
- Safety features added to the system.

In addition to the disclosure above, it is noted that the system for controlling and monitoring a vehicle may comprise a central controller for example connected with basic display 176; a user interface controller for example connected with display 174 for more entertainment related applications; an icon display 176 showing legally required drive-related information and safety information; a touch-enabled display 174; a number of buttons 32 for basic input. More in particular the central controller may be connected to the user interface controller by a dedicated communication bus, and the central controller may be connected to the icon display by a dedicated communication bus, and the central controller may be connected to some of the buttons by dedicated communication busses. Further, the central controller may be connected to all other electric systems other than the buttons, the user interface controller and the icon display by one or several communication busses, the user interface controller may be connected to the touch-enabled display by a dedicated video bus and a dedicated bus for touch control, and the user interface controller may be connected to some of the buttons by dedicated communication busses. The icon display and the touch-enabled display may be glued to a single cover plate. The expression "controlling" may mean, in the context of the present disclosure the act of changing the state of the vehicle using any available means. The expression "monitoring" may mean the act of reading the state of the vehicle using any available means.

The central controller may comprise: an integrated circuit, all peripheral components required for operation of said integrated circuit, a printed circuit board, a software program. More in particular the integrated circuit and the peripheral components may both be mounted on the printed circuit board and the software is loaded onto the integrated circuit.

Preferably the central controller performs centralized coordination and monitoring of all electric systems inside the vehicle which are required for driving or performing legally required functions.

Preferably, the user interface controller may comprise: a computing device, all peripheral components required for operation of said computing device, a printed circuit board, and a software image comprising software for controlling all hardware of said user interface controller, an operating system and application software that is specific for performing the functions required of said user interface controller. More in particular, the computing device and the peripheral components may be mounted on the printed circuit board and the software image is loaded onto the integrated circuits.

The user interface controller may offer to the driver of the vehicle a rich user interface for enhancing the driver experience and more detailed monitoring and control of the vehicle.

The icon display may further contain icons for all tell-tales and indicators required by international legislation for the type of the vehicle, currently being two tell-tales for the left and right direction indicator, a tell-tale for low-beam headlight, a tell-tale for high-beam headlight and a hazard warning signal.

The icon display may further contain a speed indicator.

Specifically in case of an electric scooter, the icon display may contain a battery charge level indicator.

The touch-enabled display may comprise a dot-matrix display with 384000 pixels or more, a capacitive touch sensor, and a touch controller. More in particular, the capacitive touch sensor may be glued on the dot-matrix display and the touch controller is connected to the touch sensor using a cable.

The touch-enabled display may present the driver with a graphical user interface.

The touch controller may further measure both mutual capacitance as well as self-capacitance and processes these in order to detect touches from bare fingers as well as from gloved fingers and to filter out false touches caused by for example water from precipitation.

Each of the buttons for basic input may be electrically connected to either said user interface controller or said central controller, using a dedicated communication bus for each controller.

The buttons for basic input, when applied on two-or-three-wheeled vehicles, may be split into two sets of buttons, one set in each steering half and mounted within reach of the driver's fingers while the driver has both hands on the steering halves in nominal driving position.

The user interface controller can be controlled using the touch sensor.

The user interface controller can further be controlled by the buttons for basic input.

The system may further comprise a server system, involving one or more servers (virtual or physical) connected to each other via a private network connection (virtual or physical), a firewall, either as a component of one of said servers or as a separate server, and software images for each of the servers. The server system may further in particular be connected to the internet via said firewall.

The system may further contain communication devices, allowing bidirectional control and monitoring between the vehicle and a personal electronic device (e.g. mobile phone, smart watch).

The system may further contain communication devices, allowing bidirectional control and monitoring between the vehicle and the server system.

Embodiments of the present disclosure may further involve that communications are performed using wireless personal area network technology (e.g. Bluetooth, NFC) between the vehicle and a personal electronic device (e.g. mobile phone, smart watch). Such communications may involve: a wireless personal area network communication device integrated with the user interface controller, either integrated in the same chip package as the computing device, or as a separate module connected to a printed circuit board using a dedicated board-to-board connector or a cable. Additionally or alternatively the communications may involve a communications antenna suitable for said wireless personal area network communication device, either integrated with said device or as a separate element connected using an antenna cable. Additionally or alternatively the communications may involve a software module for the user interface controller, included in the software image, containing the software required for connecting the monitoring and control functions of said user interface controller to the wireless personal area network communication device. Additionally or alternatively the communications may involve a personal electronic device (e.g. mobile phone, smart watch) that supports said wireless personal area network technology. Additionally or alternatively the communications may involve a software application for said personal electronic device (e.g. mobile phone, smart watch). Additionally or alternatively the communications may involve software required for performing monitoring and control functions on the personal electronic device. In such a case, in particular the software may comprise a graphical user interface showing a subset of the vehicle monitoring data and offering a number of controls, and/or software required for establishing a connection to said vehicle using the means provided by the operating system of the a personal electronic device (e.g. mobile phone, smart watch), and/or application logic for mapping monitoring data from said vehicle to user interface elements and for mapping user actions to control commands for said vehicle. More in particular, the software application may exist in several versions, one for each personal electronic device (e.g. different iOS versions, different Android versions) that is to be supported.

The present disclosure may also relate to a method for authorizing a personal electronic device (e.g. mobile phone, smart watch) to establish a connection with said vehicle, comprising that the user performs an action to trigger the vehicle to enter a dedicated software state for accepting new authorizations; the vehicle generating a secret cryptographic key; the vehicle sharing this key with the personal electronic device using a method suitable for insecure communication channels (e.g. Diffie-Hellman key exchange protocol, for example disclosed in U.S. Pat. No. 4,200,770, also used in Bluetooth). The vehicle and the personal electronic device may use said secret cryptographic key to secure subsequent communications. The personal electronic device may use a hardware-bound identifier to sign subsequent control messages.

Embodiments of the present disclosure may further involve that communications may be performed using wireless local area network technology (e.g. WiFi) between the vehicle and a wireless access point connected to the server system via the internet. Such a set-up may comprise (the same as for personal area network communication device) a wireless local area network communication device integrated with the user interface controller, either integrated in the same chip package as the computing device, or as a separate module connected to the printed circuit board using a dedicated board-to-board connector or a cable. A communications antenna may be provided in that it should be suitable for said wireless local area network communication device; either integrated with said device or as a separate element connected using an antenna cable. Further a software module may be provided for the user interface controller, included in the software image, containing the software required for connecting the monitoring and control functions of said user interface controller to the wireless local area network communication device. Further a software module may be provided for the server system.

Embodiments of the present disclosure may further involve that communications are performed using cellular network technology (e.g. 3G/4G/LTE/5G) between the vehicle and the server system. Such a set-up may involve a cellular network communication device integrated with the user interface controller, either integrated in the same chip package as the computing device, or as a separate module connected to a printed circuit board using a dedicated board-to-board connector or a cable. Additional or alternatively there may be provided a communications antenna suitable for said cellular network communication device, either integrated with said device or as a separate element connected using an antenna cable. Additional or alternatively there may be provided a software module for the user interface controller, included in the software image, containing the software required for connecting the monitoring and control functions of said user interface controller to the cellular network communication device. Finally, the set-up may involve providing a software module for the server system.

The system may further comprise a front-facing, driver-facing, rear-facing and/or side-facing camera for an anti-theft function, safety function and entertainment functions, wherein said driver-facing camera 129 is integrated with the cover plate 182.

Sharing

The scooter may be optimized for sharing. For sharing purposes, granting access to a vehicle in a convenient way, guarantee safety during sharing of said vehicle, and optimization of use, is of importance. The scooter may comprise several features that make it possible to share the vehicle.

The vehicle may comprise wireless communication techniques such as Wi-Fi, Bluetooth and cellular internet connection. Via these communication techniques, said vehicle may communicate with other electronic devices such as a (smart)phone. The owner of said vehicle can, via—for example—an application on an electronic device, switch the vehicle to certain hardware and software states, such as "available for sharing", or to "not available for sharing". The owner of the vehicle can also choose to share its vehicle with one or multiple specific persons, a certain group of people, or everyone.

The owner of said vehicle can track, for example via an application on an electronic device, driven kilometers, time, state of charge and other parameters and use this information to (automatically) charge costs with regarding the shared use to incidental users (not owners).

Said vehicle may comprise several features that makes it easier to locate a vehicle, when a user searches for a vehicle. Via said application, a user can see said vehicle's location, which is determined by the vehicle via eg. GPS and sent over via eg. a cellular connection. Once a user is nearby the vehicle but can't find it yet, the user can, via said application, turn on certain audible or visible signals on the vehicle, eg. flashing the signal lights. Also, a user can choose to receive a sound signal from the vehicle, eg. a certain sound via said speakers and/or horn.

A user can unlock said vehicle without the need of a physical key. Said physical locks, such as the cable lock in the base plate, the steering lock and the drivetrain lock in the swingarm 62 and the luggage space lock can be controlled by eg. said application on an external electronic device, such as a telephone or a keyfob (as described above). Also, said vehicle comprises one or more luggage spaces that can be opened remotely. In case a user rents the vehicle from the vehicle owner and requires eg. a helmet, the user can open a luggage space without the need of a physical key, for example by using said application on an electronic device or a keyfob, when the user is nearby the vehicle. Such proximity can be determined by comparing position signals, from both the user and the vehicle. Position signal can be deduced from eg. a GPS signal from said vehicle, Bluetooth and/or a cellular connection or by other means. A luggage space can be opened by unlocking a lock by means of, for example, an electro-mechanical actuator. The vehicle may further be locked by means of a virtual lock. This virtual lock can be unlocked in multiple ways. The virtual lock can be unlocked by a physical key-fob, which wirelessly communicates with said vehicle, eg. by NFC technology. Another manner to unlock the virtual lock is by using an electronic device, such as a telephone, that wirelessly communicates with said vehicle, eg. via Bluetooth or NFC technology. Such wireless communication requires that the device is enabled by said application to unlock a certain vehicle. Another manner is by unlocking the vehicle via an internet connection. Another manner of unlocking said vehicle could be by typing in a certain code, password or pattern on said vehicles display or a user's personal electronic portable device. Other means of unlocking said vehicle could be, but is not limited to, a finger print or iris scanner. All methods of unlocking the virtual lock, except for the first one, require no specific physical attributes and are therefore suitable for sharing.

In order to prevent a thief from stealing said vehicle, for example when the vehicle is enabled for sharing, an owner can, via said application, set a geographical area in which a user can drive. Outside such a set area, the vehicle can only be used in a limited fashion, eg. by limiting said vehicles speed or any other of the scooter's functions, or will be entirely disabled, until said user or potential thief returns into the set geographical area.

To prevent dangerous situations, a user can get several audible and/or visual alarms, when the user gets close to a border set by an owner. The vehicle location will be determined using the vehicle's GPS receiver and/or a cellular connection.

Battery

The vehicle 1 has a battery 116 located under the footrest 22 for the purpose of providing electrical energy to the drive system as well as all other electrical systems (e.g. lights, sensors, central (vehicle) controller, controller(s), et cetera). The battery 116 has a modular design and comprises several battery modules 118, meaning its capacity can be increased or decreased by adding or removing modules 118 respectively. A battery 118 consists of at least one but possibly more modules. The modules may be electrically connected in parallel. A parallel connection of battery modules 118 results in that the battery assembly can be distributed in the interior of the shell or body of the scooter, for example in a space under footrest 22, enabling provision of sufficient power (current), while the combined battery is always rated at the same maximum and minimum voltage regardless of number of modules. This has for an advantage that costly power electronics, such as additional BMS slaves, can be omitted. Additionally, all power electronics can be rated on the same voltage level, reducing costs. The maximum current output from the battery increases as a number of modules is increased. However, the cost of fuses and wires rated for higher current is far lower than the cost of higher voltage rated power electronics.

A module 118, may consist of one or more battery cells. These cells may be connected either in parallel or series or both to reach desired voltage and capacity outputs. A cluster of cells are cells that are connected in parallel to increase capacity of the module without increasing voltage. A cluster may consist of two or more cells. Multiple cells or clusters may be used to increase voltage output of the module by connecting them in series. To prevent inrush currents caused by differences in voltage levels of multiple modules, a BMS or the like may monitor and balance cells or cell clusters voltages over the multiple modules. This is done by connecting the respective cell clusters of a specific module 1 to those of module 1+n electrically in parallel. Where n is between 0 and the total number of modules present that comprises the battery minus 1. For instance the third cell cluster of module 1 may be connected to all third cell clusters of all other modules and the BMS. FIG. 22 shows an exemplary schematic of three modules with three cell clusters each, and their connections. Electrical connection is established through an arbitrary electrically conductive material, such as copper. This may be in the form of a bus bar, wire, weld, etc. The electrical connection may be realized by addition of extra material or parts, or may already be present by design in the modules. This enables the modules to be easily connected to each other without having to do extra assembly steps to connect all cell clusters to each other as described above. Finally, the two poles of the modules (plus and minus) are connected to each other in parallel as described earlier. This can be done by adding extra parts such as a bus bar or wires or by module design. For example, a first module can be connected mechanically to a second module while simultaneously connecting all necessary electrical connections. The mechanical connection may for example be done by bolting, clicking and/or clamping mechanisms.

Once the battery is assembled it can be fitted in the vehicle. To prevent shifting movement of the battery, after it is fitted, it is held in place by pre-assembled features, such as fixtures. These fixtures may be connected to the plastic shell 2 mechanically.

The assembly of the battery in the plastic shell 2 may be achieved as follows. The battery is entered into the internal space of the vehicle through the opening under the seat where, in a later assembly step, the buddy space will be fitted. It then slides to its allotted position in the plastic shell 2 until it is accommodated at the most forward possible position available for the assembly of the battery. This may be achieved by guiding the assembled battery along the perimeter of the space under the footrest 22 over for example rails. To secure the battery from moving, the aforementioned features/fixtures may hold it in place. This may be achieved by arranging a fixture in the most forward position of the plastic shell 2 at the end of the battery which encloses it (partially). Since this area is hard to reach after the battery is placed, the fixture may be designed such that movement is restricted without needing extra parts to do so by placing bolts for example. Potential embodiments, designed to achieve this function, may enclose the battery assembly (at least partially), and clamping or clicking. At the other end of the battery, movement can be restricted by placing bolts, since this area is easier to reach through aforementioned opening under the seat through which the battery fitted. Finally, electrical connections can be made between the battery and other electronics, which require electrical energy from the battery assembly.

FIG. 22 exhibits a schematic view of an exemplary battery pack 200 with BMS containing three modules 201, three cell clusters 202, and three cells 203 per cluster 202.

Active Safety

The vehicle may be equipped with a system to monitor the vehicle for improving safety of the driver, passenger, if present, and bystander(s). The active driver safety system may actively control throttle response, when it is sensed that the drivers' requested throttle exceeds the vehicle's potential performance or what would be safe to do regarding the driver, passenger, or bystander(s). The system gathers data from various sensors and cameras in the vehicle and information about its environment from the internet and GPS. For certain decisions, only data from the sensors or the internet could suffice. With all the information it gathered, the system can then limit or adapt any scooter characteristic, such as motor torque output, throttle response; motor speed; speed; maximum current drawn from energy storage system; braking characteristics, such as distribution, maximum braking power, anti blocking system parameters or braking; adjusting vehicle dynamics, such suspension parameters (stiffness, damping coefficient) to ensure the safety of people in close proximity, as well as the driver and possibly also a passenger.

There are several types of subsystems that provide information for the safety system to act upon. The first is the vehicle state estimation subsystem. This first system may measure and calculate various states that the vehicle could be in, e.g. standing still on the kickstand, driving straight ahead or cornering, or charging, and then estimates corresponding forces, velocities, power consumption, etc. accordingly. The second system is the driver and passenger position subsystem. This may measure and calculate where the driver and any passenger is/are located and what they are doing, e.g. sitting on the vehicle, standing on the footrest, looking to the left or straight ahead. The third system is the environment estimation subsystem. This third system may deduce where the vehicle is located and in what type of weather and surroundings, e.g. in the Italian Alps during a thunderstorm on asphalt, outside in 35° C. in full sun on the beach, or on an icy road at night time. The fourth system is the close proximity object recognition subsystem. This system may identify objects in close proximity that could be living beings like humans and animals or non-living entities like cars, buildings, bridges, rivers, lamp posts, etc. The object type could also be combined, e.g. a person on a bicycle.

To gather these four data types, the vehicle may use different types of inputs that can increase accuracy or certainty of its calculations. The first type of input is gathered by sensors that may measure various values of the vehicle and users. These are for example accelerometer, gyro, wheel speed, throttle position, steering angle, brake pressure, tire pressure, suspension travel, motor axle position, shunt, internal temperature sensors, pressure sensors in seat and footrest, kickstand position, main stand position, passenger footrest sensor. The second type of input is gathered from outward oriented types of sensors or camera's, such as front facing camera, rider facing camera, rear facing camera proximity sensor (sonar, radar, ultrasonic, magnetic, IR, etc.), humidity sensor, outward temperature sensor, light intensity sensor. The third type of input may be gathered through various connectivity possibilities such as GPS, 3G, 4G, WiFi. NFC. Bluetooth, etc. and find information about weather forecasts, traffic and road works, date, time, location, communication with other vehicles, activities which gather a lot of people to certain areas such as festivals, protests, or other events, news updates, or any other type of information that could alter driving behaviour or safety assessment.

The four subsystems described above, of which any embodiment of the present disclosure may deploy at least one, can use multiple inputs from the different input types described above. The same input may consequently be used for more than one of the four subsystems simultaneously. For example, the front facing camera may be used by the state estimation system to check for precipitation and adapt or alter maximum motor torque output with detected precipitation. The same input may be used by the environment estimation system to verify if the weather forecast gathered through the vehicle's connectivity options is correct, and may further also or alternatively be used by the close proximity object recognition system to see if there is someone or something in front of the vehicle.

Based on the information provided, the active driver safety system may alert the driver while driving or standing still through sounds, indicators or popups on the touchscreen, limit vehicle power, torque and velocity, or shut off the vehicle completely and call for assistance with or without driver permission, depending on a prevailing safety risk factor. For example, the system may limit torque and speed when it senses the kickstand is still extended and send a popup on the touch screen or light an indicator in the cockpit or on the display, or it may turn off the vehicle completely when it senses the battery is heating up too much and in extreme cases (e.g. thermal runaway and fire) call local authorities while alerting other road users in proximity by sounding an alarm and blinking lights, and sending vehicle status reports through various connectivity channels.

The vehicle 1 may be equipped with a steering angle sensor 153, which can measure an angle between front tire 80 and the centreline of the plastic shell 2 when viewed from above. Depending on this value, the electric or electronic control unit ECU (central vehicle controller) 120 may limit the maximum torque, power and velocity output of the motor. This is done to make sure the vehicle doesn't accelerate too quickly around the defined corner or prevent wheel skidding causing the driver to lose control over the vehicle.

The vehicle 1 may be equipped with an accelerometer, which can measure the vehicles accelerations in all directions with respect to the ground. Depending on such measurements the central (vehicle) controller 120 may calculate the forces exerted by the tires on the road and limit maximum motor torque to prevent wheel slipping and control and stability loss of the driver over the vehicle.

The vehicle 1 is equipped with an accelerometer or a gyroscope sensor 155 which measures the angles in all directions of the plastic shell 2 with respect to the ground. The central (vehicle) controller 120 may use these values to determine how many people and/or how much luggage is carried on the vehicle 1 and at which position. Additionally, the central (vehicle) controller 120 may adjust mass and centre of gravity parameters used to calculate forces exerted by the tires on the road in collaboration with the aforementioned accelerometer.

The scooter 1 may be equipped with sensors 26 in the seat 24 or in footrest 22 (e.g. pressure) to determine how many people are situated on the vehicle. The central (vehicle) controller 120 may use this information in collaboration with aforementioned gyro to determine the mass and centre of gravity parameters. Additionally, this information may be used to determine if the driver and/or passenger is still seated on the vehicle 1. If the central (vehicle) controller 120 registers a sudden change in sensor value this may mean that a person has fallen off the vehicle or is standing solely on the footrest 22 and can therefore limit power, torque and velocity of the vehicle 1 as a safety measure.

The vehicle 1 may be equipped with suspension travel sensors to measure front and rear suspension movement. The central (vehicle) controller 120 may use this information in collaboration with aforementioned seat 24 and footrest 22 sensors and gyro to the same end.

The vehicle 1 is equipped with internet connectivity systems (e.g. 3G, 4G, WiFi) to gather information about local weather forecasts which may be used to determine a tire friction coefficient. This is then used to determine maximum motor torque to prevent wheel skidding. Additionally, these connectivity systems may be used to gather information about local road or driving surface conditions (e.g. asphalt, potholes, sand) to also determine the tire friction coefficient. Additionally, these connectivity systems may be used to gather information about time, date and local temperature to also determine the tire friction coefficient. Additionally, connectivity systems may be used to determine most efficient navigation routes. Additionally, this information may be used to alert the driver to special occasions, events or points of interest located en route or nearby.

The scooter 1 may be equipped with a GNSS sensor 154 (e.g. GPS) to work in collaboration with aforementioned internet connectivity systems to the same end.

The scooter 1 may be equipped with a humidity sensor which gathers information about local humidity levels and precipitation probability. This may work in collaboration with aforementioned internet connectivity systems to the same end.

The scooter 1 may be equipped with a front facing camera 130 in FIG. 1 to recognize local precipitation (e.g. rain, snow, hail) to work in collaboration with aforementioned internet connectivity systems to the same end. Additionally, the front facing camera 130 may be used to recognize local road or driving surface conditions (e.g. puddles, potholes, sand). Additionally, the front facing camera may be used to determine local (sun)light levels, objects, obstacles, people, other vehicles, et cetera. The forward facing camera 130 may further register traffic, for example an accident. The camera may be triggered to come into action or images from the camera may begin to be stored, when sounds captured with for example the microphone(s) 133 of the embodiment of FIG. 23 indicate occurrence of an accident, such as loud and long car horn sounds, screeching tyres, and loud bangs. This requires sound analysis of the captured sounds using any available control, such as a micro controller or even a CPU of a user/driver owned mobile device. When an accident is suspected to be occurring, based on captured sounds, images from the camera are stored on the scooter or forwarded to a remote server. Saved or forwarded images can relate to some time before the accident up to some time thereafter. As an alternative for sound analysis, the camera may be configured to come into action to register images from around and more in particular in front of the scooter when a gyroscope indicates that the scooter has spun or toppled, or when any measured acceleration exceeds a threshold, or when a GPS sensor indicates that the scooter has moved, or is about to do so. Likewise, signals from the camera itself may be analysed. Further, the analysis may be directed at detection of vandalism and registration of perpetrators thereof, instead of traffic images. Likewise the forward facing camera may also be employed for face recognition of an owner in front of the scooter, to allow de-activation of a lock or the lock, such as the electronic lock described elsewhere in the present disclosure, just like the rearward facing camera 129 described elsewhere in the present disclosure, in particular FIGS. 19 and 23.

The scooter 1 may be equipped with a driver or rear facing camera 129 in FIG. 23 to recognize local precipitation and weather conditions to the same end as the previously mentioned front facing camera. Likewise, using face recognition, images from the rear facing camera may be used to determine, using a controller processing images from camera 129, whether a person on the scooter is authorised to be driving the scooter, and thus prevent theft, or even the state of mind of a driver, to adapt safety levels based on the driver's state of mind. If a person on the scooter is not authorized, it may be a thief. Saving images may be decided on by the controller, triggered by analysis of the images themselves (face recognition), signals from a gyroscope, a GPS sensor or accelerometer, and the like. The rightful owner and/or authorities may then be alarmed, potentially via a server. Images from the rear facing camera in the form of a movie may be saved starting some time before an event is detected, up to some time thereafter. Alternatively, a single or more than one still image may be saved. The user/rightful owner may activate this functionality even when the power of the drive motor is turned off, for example when parking in a danger area with a high theft risk. Alternatively this function may be activated automatically, for example based on information from a web site with information about high theft-risk areas, such as GeoFence.

The scooter 1 may be equipped with a means of connecting it wirelessly (e.g. Bluetooth) to another device with connectivity systems (e.g. other vehicles, smart phones) which may be used to gather its information on local weather forecasts, driving conditions, traffic, or any other useful information regarding driver safety to be used by the vehicle to determine maximum motor torque. In addition to or as an alternative for motor torque, a scooter's anti-lock braking system can also utilise this input to be dynamically adapted to circumstances. Additionally, this information may be used to determine most efficient navigation routes. Additionally, this information may be used to alert the driver to special occasions, events or points of interest located en route or nearby.

The controller may be connected to display 174 and configured to visualize on the display 174 indications of the scooter characteristics adapted by the controller. For example the maximum speed may be lowered and throttle response may be made slower in case of a driver, a passenger and heavy cargo on the scooter, and this adaptation of the scooter's characteristics may be visualized on a display for example the display 174. The controller may be configured to attribute a safety score on a scale to the safety aspect determined by the sensor, and adapt the scooter characteristic, when a safety score exceeds a predetermined threshold. Then, the controller may be configured to adapt the predetermined threshold for any safety aspect based on a safety score for another safety aspect. For example the controller may adapt a safe threshold for the safety aspect of speed based on a determined traffic intensity, for example detected using a microphone 133 indicating heavy traffic through a high traffic noise input or using front facing camera 130, or any other available camera, through image processing. The overall safety level is preferably determined by the strictest safety level of all individual sensors. If, for example, the safety level based on vehicle speed is a safe value, but there is a lot of noise around indicating lots of traffic around then the safety level computed based on the noise level detected with the microphone 133 or the camera front facing 130, then the overall safety level is the stricter one of heavy traffic detected through the microphone 133 or the camera 130. The scoter may comprise at least one additional sensor, wherein the controller is configured to attribute weights to safety aspects determined by the sensor and the at least one additional sensor, and determine an overall safety level from the weighted safety aspects. The safety level may then be a weighted average of all sensors. Weights may be determined by analysis, experimentation, an adaptive algorithm or can be preselected from a limited set by the user. Users should preferably not be allowed to tamper with all weights.

The safety level may be determined by processing each sensor input individually, whereby for each of a number of sensors a score is computed that is a measure for the safety of the vehicle and the driver. Thresholds may be used to determine the safety level for each sensor. Weights attributed to the safety aspects may be at least one of a group of: determined based on analysis of for example of driver behavior, predetermined based on experimentation and/or simulation; determined based on driver behavior; and/or may be adjustable by a driver. User or driver behavior may be assessed using any number of: the rear facing camera 129 (can also be used to assess driver's state of mind and authorization to drive the scooter), accelerometer, steering angle sensor 152, wheel speed sensor, gyroscope, motor torque, throttle control or other physical movement sensor to determine the safety level: the sensor data is processed and the overall intensity of movement is calculated by measuring statistical properties, and the number of sudden maneuvers per time unit is counted to assess the safety level: more sudden maneuvers mean a lower safety level than fewer sudden maneuvers. Overall safety level calculation may be performed such that the overall safety level for both the individual sensors and/or the overall vehicle safety level is determined by an adaptive algorithm that takes as input information about how safe the situation appears to be (indicated by how well the driver uses the interface, for example by measuring the number of interactions with the vehicle, how many touches on the screen go wrong, strong accelerations/decelerations or brake actions, sudden maneuvers), and which adjusts the safety level thresholds and the weight of each sensor accordingly. More in detail, for an instance in which the safety level is wholly or partially determined by the speed of the vehicle, safety levels may be as follows:

level 0=safe, vehicle at standstill, motor off (vehicle on parking space);

level 1=standby, vehicle at standstill, motor on (red traffic light condition);

level 2=low speed, vehicle speed<5 km/h, level 3=medium speed, 5<=speed<=15 km/h, level 4=high speed, speed>15 km/h, etc.

Speed tiers may change or be extended depending on vehicle type (motorcycle will have even further tiers for highways, etc), the above disclosure is exemplary and non-limiting; using alternative sensors, alternative numbers of safety levels and alternative sets of thresholds is all within the scope of the present disclosure.

The safety sensor may comprise a speed sensor from a group comprising at least a wheel speed sensor, a GNSS or GPS 154 positioning sensor and an accelerometer and/or a gyroscope 155, wherein the controller is configured to adapt at least one scooter characteristic from a group, comprising maximum speed, torque, acceleration, et cetera. The safety sensor may comprise camera sensor 130, wherein the controller is configured to determine a safety aspect from a group at least comprising traffic intensity and rear or front or side traffic distance. Camera images may then be processed to determine the amount of traffic around the vehicle and the distance relative to other traffic. Image processing may then comprise counting the number of vehicle-like shapes, person-like shapes, two-wheeler-like shapes (and other shapes that appear in traffic), and considering the size of these shapes for distance assessment. By employing the driver facing camera 129, it's possible to determine the attention level of the driver. The position of the eyes and direction of the face is tracked to determine where the driver is looking, and if he is focused forwards and not looking at the screen too long, then the safety level is high; conversely if the driver is looking around most of the time or looking at the screen a lot, the safety level is lower. The safety sensor may comprise microphone 133, wherein the scooter's controller 120 in FIG. 2 is then configured to determine a safety aspect from a group at least comprising traffic intensity. Microphone input may be analyzed and the level of traffic and the chaos state of the traffic may be calculated by measuring statistical properties of the sound, overall sound pressure level, sound pressure level in various frequency bands. Additionally or alternatively the number of horn soundings or strong verbal utterings may be used to compute an overall traffic intensity score which is then translated to a safety level using a threshold or an adaptive algorithm, possibly also using other sensor input such as vehicle speed.

The scooter may further comprise a communication, application or entertainment display (174) for visualization of at least one for the scooter non-essential application interface, and wherein the controller is configured to enable or disable applications for the display 174 based on a determined safety aspect. Apps intended for visualization on the display 174 on the scooter must claim permission to be active at a certain safety level. This is the permission to be allowed to be active at a particular safety level in the first place. All apps are allowed to run at the minimum safety level; the review process whether to allow apps to run or allow visualization of an interface on the display applies preferably to all safety levels, higher than the minimum level. The concept may be that a current safety level is communicated to apps, allowing or requiring the app to change its user interface depending on the safety level. Change can be achieved in many ways. It can mean any change in appearance of user interface elements including but not limited to position, size, visibility, color, opacity, blink level. For example: at a safety level indicating lower safety, fewer functions should be available (e.g. a driver should not be allowed to watch movies when not at standstill), icons may be hidden, icons may become larger in size, easier to control from peripheral vision. Or the other way around, at safety levels indicating high safety, features may be made visible that are not used at other safety levels. Further, at a certain safety level only one dedicated app may be allowed to be running, the one that is designed to be used at speed. For example: a driver can read news, send whatsapp messages or watch movies or check social media while standing still at a traffic light, but as soon as the scooter starts driving, the interface changes to drive mode where all this is not possible, forcing the driver to focus on safe driving (and navigation).

Using different types of sensors, cameras and the like, it is possible to monitor or determine scooter aspects and/or state, load of the scooter and/or force acting thereon, environment aspects and/or state, driver state, for example audacity and/or mindset, safety aspects, and the like, to enable a controller to adapt at least one scooter characteristic of a group, comprising adapting: throttle response; motor torque; motor speed; speed; maximum current drawn from energy storage system; braking characteristics, such as distribution, maximum braking power, anti blocking system parameters or braking; adjusting vehicle dynamics, such suspension parameters (stiffness, damping coefficient). Thereby, safety may be enhanced for drivers, passengers and/or cargo transported with the scooter, as well as bystanders.

Roll-Up Cable

All electric vehicles need to be charged. This can either be wireless or with a power conducting cable of some sort, for example cable 121 with plug 122 in FIG. 1. Common embodiments of such a cable are for example a separate cable that connects with a connector to a power source on one end and with another connector to the vehicle on the other end. In this case the cable will have to be carried separately, taking up cargo space and requiring multiple actions to operate. A second embodiment uses a cable fixed to the charging station. This alleviates the need to carry the cable but confines the ability to charge to specific locations. Also, when using a fixed cable it is less easy to replace which might be necessary in the lifetime of the product, it being a relatively delicate component. As a third option, an embodiment is proposed where the charging cable is carried on the vehicle but takes up less cargo space and is already connected to the vehicle alleviating the action of connecting to the vehicle. Ideally it would also be incorporated as being a single easy to replace cartridge. Furthermore, it could automatically retract to provide even more convenience to the operator.

The embodiment would ideally consist of a spring loaded cable reel schematically represented by spool or reel 123 in FIG. 2, where such a spool may be placed in a cable compartment in or on the vehicle body. When arranged in the scooter body, it is ideally but not necessarily placed at an inconvenient place for cargo storage so as not to reduce cargo carrying capacity. This may result in poor access to the cable reel for winding the cable back onto the reel after charging, for which reason the reel is preferably spring loaded to automatically retract the cable into the cable compartment after charging the batteries. The cable end will be presented somewhere on the perimeter of the vehicle possibly behind a lid or under an existing overhang. Ideally the retraction point would be placed low on the vehicle and near the centre of the vehicle footprint to decrease the chance of the vehicle tipping over due to force on the cable. Also, for the purpose of stability, the cable may extend out of the scooter body through a passage which is positioned at or near a centre of a contact area of the scooter on a road surface or pavement during charging, where such a contact area is defined by a triangle defined by the wheel's and an extended stand. However, an alternative or potentially additional consideration is that the cable end must extend through a passage out of the scooter body sufficiently high to prevent contact of the cable end or plug 122 with a road surface when driving. The reel cable spring assembly would be incorporated in a single cartridge only requiring to be connected to the vehicle once whilst still being easy to replace. One realisation of such an aforementioned embodiment would be a cable reel incorporated in the bottom of the opening seat of a scooter type vehicle with the cable end being presented at the front of the seat, as shown in FIG. 2, but other positioning of the cable or a spool 123 therefore may equally be possible. When the opening seat is locked it could also be used for securing the cable when not in use by obstructing access to the retraction point. Furthermore, guide rollers could be added to allow for easy extraction and retraction from multiple angles. More than one cable 121 or spool 123 may be provided at different positions around the scooter 1 to allow easy extraction and retraction from distinct vantage points around the scooter.

Audio and Microphones

Audio delivery and registration using audio-acoustic transducers becomes more and more important in vehicles and in scooters in particular, due to increasing integration of smart technologies that rely on audio. For open vehicles an extra challenge exists due to the high degree of sound power loss to the environment and ambient noise.

For generating sounds, a solution may be proposed that uses an array 131 in FIG. 23 of speakers 36 in FIG. 12, to create a listening sweet spot 132 in FIGS. 24 and 25 around the listening position of the operator—the driver of the scooter. With traditional single speakers sound is radiated in a spherical way causing the sound intensity to decay with the area of the radiated sphere, $4\pi*r^2$, a four times decrease for every doubling of the distance. When speakers are arranged in a line array, or in particular two essentially horizontally oriented speaker arrays, sound can be made—if properly configured—to propagate like a cylinder with a corresponding surface area increase of $2\pi*r*h$, resulting in a linear sound intensity decrease with distance, resulting in a lower power requirement for a certain sound intensity at a certain listening position of the sweet spot 132. Due to interference, horizontal speaker arrays 131 on opposing sides of and potentially even symmetrically relative to a centre plane of the scooter, will exhibit a normally tall vertical pattern useful for targeting the operator/driver. As an accompanying benefit, less sound hindrance is created to pedestrians and other traffic users. When a wide spread of audio is desired, for example when the vehicle is stationary and there is a larger audience, this can still be achieved by introducing actuation delays from speaker to speaker. When the exact listening position is known, for example from measurements employing microphone array 133 in FIG. 23, listening to the voice delays or from a head tracking camera, the listening sweet spot 132 can be further concentrated to this position using exact speaker delays. When said speaker array is mounted on a pivoting body, like a steer on a two wheeled vehicle, the displayed pattern will pivot with this body. This can be compensated for by measuring this angle using some sensor and introducing speaker delays to aim said pattern in the opposite direction.

The embodiment would ideally exist of a horizontal array of speaker drivers, directed at the listening position of the operator 134. The speaker drivers will be actuated without delay resulting in said normally vertical sound pattern. When a wide audio spread is desired speakers will be delayed starting with actuation of the centre driver and then diverging left and right.

For sound registration, using the microphones 133, voice recording may also be made possible for making telephone calls or recording memory messages. Voice recording is becoming more and more important in vehicles due to increasing integration of smart technologies that rely on voice input. For open vehicles, an extra challenge exists due to the large amount of ambient noise associated with such vehicles, as these do not have an enclosure for the driver to sit in. A solution to this consideration may be that an array 133 of microphones is used to enable filtering of the ambient noise, such a wind during driving and road noise, in the processing of the recording. This filtering can be made more accurate when more information about the unwanted noise is known. For this purpose other vehicle sensors can be consulted. One principle source of unwanted noise is driving wind. Influence of driving wind on voice recording is largely dependent on vehicle speed and principle approach angle of the wind. Vehicle speed can be deduced from existing on board sensors, like wheel speed sensors or GPS sensors 154. Approach angle can be influenced by the static wind direction. The effect of this can be determined by evaluating the different sound pressure levels recorded by the different microphones. When there is a large prevailing wind that is not completely tangent or perpendicular to the vehicle trajectory a difference in measured sound pressure level will arise. When properly calibrated the direction and speed of the wind can be estimated and used as an input for the calculated vehicle's speed and/or range.

Pin Lock

Swingarm 62 comprises an embedded locking mechanism in the form of for example a pin 126, slider or swivel. This is schematically represented in FIG. 16A in an open state and in FIG. 16B in a locked state. Pin 126 is made of a specific material, eg. hardened steel, that is very hard to fracture or break. The mechanism 127 holds the pin 126 in a normally retracted position in the swingarm 62, for example by means of a spring, but can be projected into the position shown in FIG. 16B in order to block the drivetrain of said vehicle, for example by engaging a disk brake 128. The latter can be achieved by projecting said pin 125, slider or swivel into, for example, a slot inside the braking disc, rim or shaft. This mechanism could for example be actuated by means of an electro-mechanical actuator, such as a solenoid. The electro-mechanical actuator is controlled by a communication bus, such as CAN or LIN-Bus. This enables the lock to be controlled remotely, for example via WiFi, a cellular connection, Bluetooth, or by other means which makes said vehicle suitable for sharing purposes and other services that require remote locking and unlocking control.

Since suddenly blocking the drive train can potentially cause dangerous situations, when the vehicle is driving, mechanical and electrical safety mechanisms that prevent the pin 126 from ejecting can be applied. The safety mechanism can comprise (but is not limited to) one of, or a combination of, the following solutions. Said mechanism can be limited to being actuated in case; a wheel speed sensor in the front wheel 80 measures no rotation in the front wheel 80; a position sensor of the motor (which is mechanically connected to the rear wheel 40) measures no rotation in the rear wheel; an accelerometer delivers a signal from which can be deducted that the vehicle is standing still; a pressure sensor 26 measures no person sitting on saddle 24; the motor delivers no torque; and/or the rear brake is engaged. Furthermore, the end of pin 126, slider, swivel or spindle can be made in a certain shape, for example the shape of a half sphere, that prevents the pin from entering the slot at high wheel speeds easily, since it will bounce back when impinging on disc brake 128. In addition to this, a certain mechanical safety mechanism can be applied whereas an object is mechanically connected to the rear wheel, and therefore rotates at similar speed as the rear wheel. This object may expand in a certain way as a result of the centrifugal force that results from rotation. Due to the object expanding, it blocks the pin, slider or swivel from entering and blocking discbrake 128 of the drivetrain or any other drive train component while driving.

As said, the lock can be controlled remotely. Both locking and unlocking are possible from a distance. Locking the vehicle remotely may pose a challenge since it requires the rear wheel to be in a correct position for the pin 126 to enter a slot in for example the disc brake 128. Since a position sensor is embedded in said motor, and said motor is mechanically connected to the rear wheel, the motor including its position sensor can be used in order to set the rear wheel in the correct position for locking the drivetrain. The latter is possible when the rear wheel is not in contact with the ground, eg. when the vehicle is parked on the center stand, but also when the vehicle is not parked on it center stand, eg. if the number of slots is sufficient and the scooter can be slightly forced for- or back-wards.

As said, the motor is mechanically connected to the rear wheel, eg. by means of a toothed belt. It can be desired to calibrate the position of the drivetrain (including one or multiple slot(s)) with respect to said pin 126. In order to reduce the work required for servicing said vehicle, calibration can be done by the vehicle itself. Automatic calibration is achieved by slowly ejecting the pin until it touches the braking disc. The position of said pin is measured by a distance sensor, which can be an external sensor, by measuring the magnetic field in the electromechanical actuator, or by evaluating the stiffness of the applied spring in combination with the known force that the actuator is applying to the spring. Such measurements result in a certain travel of the spring and therefore a known distance over which pin 126 extends. When pin 126 touches disc brake 128, a minor force keeps pushing the pin against said braking disc. At the same moment, the motor starts to turn slowly until the pin has entered the slot. The sudden movement of said pin is detected by said distance sensor, and the position is memorized by said motor controller and/or electrical control unit. The position of the pin, relative to the slot(s), is then fully known and can be stored for future reference, when locking the vehicle is desired.

Cable Lock

Figure 4:
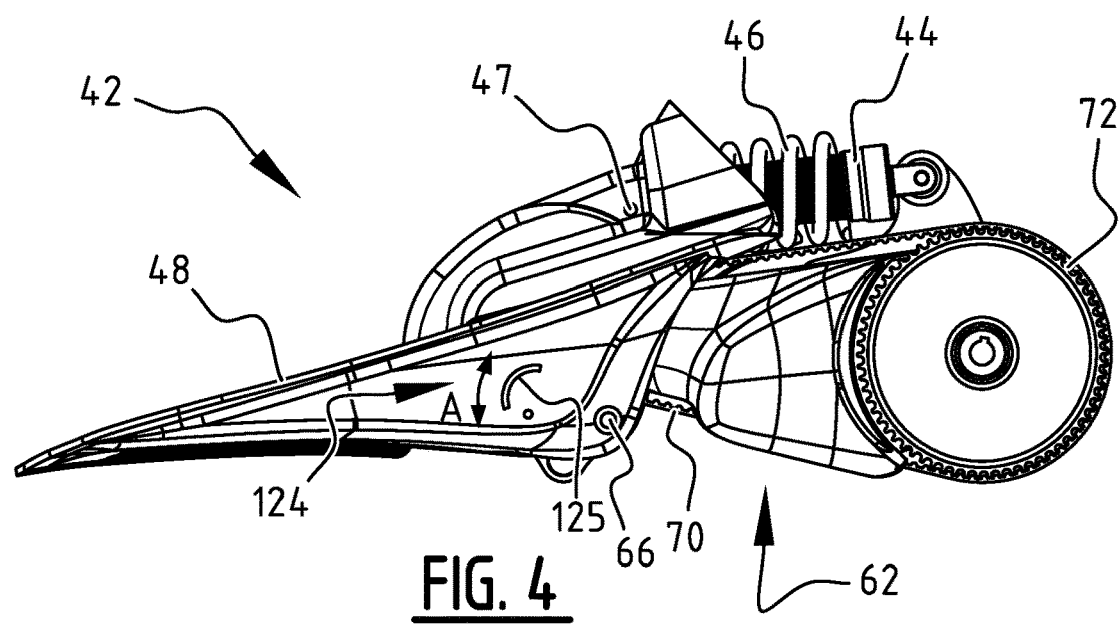
FIG. 4 is a side view of the baseplate with drive train, swing arm and rear wheel suspension of FIG. 3.

The base plate 42 can comprise a connection point 124 for a certain locking pin 125 to connect, as is schematically represented in FIG. 4.

In this way, a cable lock can be connected to said vehicle. Said connection point 124 comprises a locking mechanism that can be controlled from a distance. This mechanism could for example be actuated by means of an electro-mechanical actuator, such as a solenoid. The electro-mechanical actuator maybe controlled by a communication bus, such as CAN or LIN-Bus. This enables the lock to be controlled remotely, for example via WiFi, a cellular connection, Bluetooth, or by other means, which makes said vehicle suitable for sharing purposes and other services that require remote locking and unlocking control.

Said connection point 124 is preferably positioned as low as possible. This ensures that a cable lock can hardly touch and therefore scratch or damage any part of said vehicle. Also, the connection point is preferably positioned in the middle of said vehicle, in which case a cable lock can be easily attached to any external object.

Also, said connection point 124 may be positioned inside baseplate 42, which eliminates the need for an additional housing and attachment points to the said vehicle, and thus eliminates needless additional weight.

In the embodiment of FIG. 4, a bracket 125 can be driven in the direction of arrow A to lock or unlock a cable.

Further advantages may be that it is a lot easier to use (less handling needed to lock/unlock) and that since it is integrated, it is possible to detect if it is locked/unlocked and connect this with active security and/or warranty information.

Driver Facing Camera—Theft Prevention

A driver facing camera 129 may be embedded in display 34, but may also be arranged in proximity of display 34, as shown in FIGS. 19 and 23. This camera 129, or any alternative front facing or rear facing camera, can for example be used in order to prevent theft. This camera can be activated remotely using eg. a cellular or WiFi connection. Also, this camera can be activated based on movement of the vehicle. Movement can be detected by using vehicles embedded accelerometer or other sensors. For example, when vehicle is in locked position, and someone touches the scooter, for example in case of attempted theft, camera 129 may be activated to take a picture or record a movie of a potential thief on, next or in front of the vehicle. The imagery can subsequently be uploaded to a server for immediate or later identification of the potential thief. Also, a warning message may appear on the display 34 to warn the person that a picture or movie has been made and uploaded to a server.

In addition, driver facing camera 129 may be used in order to detect eyes of a driver, and, for example, warn the driver in case he/she is not keeping his/her eyes on the road, or falls asleep while driving.

Also, driver facing camera 130 may for example be used to analyze the mood and happiness of a driver during use of said vehicle. Also, the driver facing camera 129 may be used to take pictures or record movies upon being activated by eg. the drivers voice, using microphone 133 or by using said buttons 32.

Also, said driver facing camera 129 may be used to unlock said vehicle, based on recognition of eg. a person's face or eyes.

Front Camera

One or more camera(s) 130 may be embedded in the front of the scooter, as shown in FIG. 1. This camera can for example be used in order to prevent, detect or record proof of theft. Camera 130 can be activated remotely using eg. a cellular or WiFi connection. Also, camera 130 can be activated based on movement of the vehicle. Movement can be detected by using vehicles embedded accelerometer and/or other sensors. During driving said vehicle, camera 130 can be turned on for assisting the driver to keep said vehicle inside a driving lane. This may be achieved by recognizing eg. road markings using image processing. The system may then warn the driver by means of audio and visual signals in case a driver crosses a line-mark on the road without using the vehicle's turn signals.

Also, camera 130 may be used in order to take pictures or record movies activated by eg. the drivers voice, using microphone 133 or by using said buttons 32.

Camera 130 may also be used to recognize and scan traffic signs, which are subsequently processed and interpreted by a processor, eg. to inform the driver about the applicable speed limits.

Camera 130 may be used in order to detect objects in front of said vehicle, potentially in combination with an ultrasonic sensor or radar. Using two camera's in a stereo vision set-up, the system can detect objects coming closer, and can eg. warn the driver or take preventive measures for example by automatically braking and slowing down or stopping the vehicle.

Front facing camera 130 may be used to detect a certain change in road conditions. For example, the camera may detect a puddle of water, snow or sand in front of said vehicle, and the controller can, based on this information, alter driving characteristics such as decide to eg. temporary limit driving torque to prevent the driven wheel from slipping.

Camera 130 may be used to capture accidents. This can for example be achieved by constantly recording imagery while driving. After a certain period, the imagery can be automatically deleted to clear storage space for new recordings. A driver can choose to for example save (locally or in externally) a certain time period in case it holds important imagery. Saving, recording and sending data may also be triggered according to extreme accelerations or decelerations, eg. in case of an accident or collision. The acceleration and decelerations are detected by said accelerometer. Saving data may also be triggered by using said microphone, for example in the event of a collision from which the collision sound is detected by said microphone, analyzed by a controller and subsequently interpreted as an event that should be saved. Saving data may also be triggered by said camera itself, for example in the event of a collision from which the collision imagery is detected by said camera, analyzed and processed by a controller and subsequently interpreted as an event that should be saved.

Sensor Pillion Footsteps

Footsteps for a passenger may comprise a sensor that can detect whether said footsteps are unfolded or collapsed against the vehicle, loaded with weight, et cetera, such a sensor may thereby be able to detect whether a passenger is sitting on said vehicle or not. This sensor may use any input to detect whether said footsteps are folded or not, and to detect whether a weight, eg. a foot pressing down on the footsteps, is resting on the footstep or not. For example, to detect whether the footsteps are folded or not, there may be an open circuit in the housing of the footsteps that closes by means of the foot step itself. The foot step may then act as a part of the circuit. To detect whether weight is resting on the footsteps, a strain gauge or load cell may be mounted close to the hinge of said footstep.

Said sensor can be used in order to warn the driver that the footsteps are unfolded whilst there not being used by a passenger. This can assist in preventing dangerous situations and reduce drag. The latter is of great importance for electric vehicles.

Also, data from said sensor may be used to adjust driving characteristics, such as throttle mapping of said vehicle. When, for example, a passenger is detected on said footsteps, more downforce on the driven rear wheel is obtained. The latter enables more frictional force on the driven wheel.

Also, such a sensor may be used in order to adjust vehicle dynamics, such as the stiffness of shock absorbers. When, for example, a passenger is detected to press on said footsteps, the stiffness of the shock absorbers may be adjusted in order to optimize comfort for two people.

Although the figures show one or more than one preferred embodiment of the present disclosure, the above described embodiment is intended only to illustrate the present disclosure and not to limit in any way the scope of the present disclosure. Whereas the disclosure mainly is illustrated using a scooter, several aspects of the disclosure are applicable for other road vehicles, such as motor bikes and trikes as well.

Although the scooter 1 described is an electric scooter 1, driven by an electric motor 114, the skilled person will understand that a frameless vehicle according to the invention would also reduce the weight of a vehicle with a combustion engine, hence improving performance of said vehicle.

It should be understood that where features mentioned in the appended claims are followed by reference signs, such signs are included solely for the purpose of enhancing the intelligibility of the claims and are in no way limiting on the scope of the claims. The scope of the present disclosure is therefore defined solely by the following claims.

The invention claimed is:

1. A scooter, comprising:
    at least two wheels, at least one of which being connected to an electric drive which is powered with at least one battery;
    a curved scooter body having a curved footrest;
    wherein the scooter body comprises an accommodation for the at least one battery, wherein the accommodation is in or under the footrest of the scooter body, and
    wherein the battery is configured to be accessible and removable from the scooter body by lifting a seating of the scooter.

2. The scooter according to claim 1, wherein the battery is configured to be accommodated in an inside curved contour of the scooter body.

3. The scooter according to claim 2, wherein the battery is curved.

4. The scooter according to claim 1, wherein the battery has a modular design and comprises a plurality of relatively small battery modules.

5. The scooter according to claim 4, wherein the modular design enables the battery modules to be accommodated in an inside curved contour of the scooter body.

6. The scooter according to claim 1, wherein the battery is an assembly of battery modules and is configured to be fitted in the scooter after assembly thereof.

7. The scooter according to claim 1, comprising a guide configured to guide the battery along a perimeter of a space forming the accommodation under the footrest.

8. The scooter according to claim 7, wherein the guide comprises rails.

9. The scooter according to claim 1, comprising a fixture configured to secure the battery after it has been slid to its allotted position.

* * * * *